United States Patent
Matsumoto et al.

(10) Patent No.: US 12,480,132 B2
(45) Date of Patent: Nov. 25, 2025

(54) HEAT RESISTANT MISMATCH ENDONUCLEASE VARIANT

(71) Applicants: TAKARA BIO INC., Shiga (JP); EDUCATIONAL CORPORATION KANSAI BUNRI SOUGOUGAKUEN, Shiga (JP); KYUSHU UNIVERSITY, NATIONAL UNIVERSITY CORPORATION, Fukuoka (JP)

(72) Inventors: Hiroyuki Matsumoto, Otsu (JP); Takashi Uemori, Otsu (JP); Tsuyoshi Shirai, Nagahama (JP); Yoshizumi Ishino, Fukuoka (JP); Sonoko Ishino, Fukuoka (JP)

(73) Assignees: TAKARA BIO INC., Shiga (JP); EDUCATIONAL CORPORATION KANSAI BUNRI SOUGOUGAKUEN, Shiga (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 743 days.

(21) Appl. No.: 17/911,541

(22) PCT Filed: Mar. 18, 2021

(86) PCT No.: PCT/JP2021/011033
§ 371 (c)(1),
(2) Date: Sep. 14, 2022

(87) PCT Pub. No.: WO2021/187554
PCT Pub. Date: Sep. 23, 2021

(65) Prior Publication Data
US 2023/0133071 A1     May 4, 2023

(30) Foreign Application Priority Data
Mar. 19, 2020  (JP) ................................ 2020-048795

(51) Int. Cl.
| | | |
|---|---|---|
| *C12N 15/52* | (2006.01) | |
| *C12N 9/22* | (2006.01) | |
| *C12N 15/63* | (2006.01) | |
| *C12Q 1/686* | (2018.01) | |
| *C12Q 1/6874* | (2018.01) | |
| *C12Q 1/6886* | (2018.01) | |

(52) U.S. Cl.
CPC ............ *C12N 15/52* (2013.01); *C12N 15/63* (2013.01)

(58) Field of Classification Search
CPC .... C12Q 1/6848; C12Q 1/686; C12Q 1/6847; C12Q 1/6886; C12N 9/22; C12P 19/30
See application file for complete search history.

(56) References Cited

U.S. PATENT DOCUMENTS

| | | |
|---|---|---|
| 5,922,539 A | 7/1999 | Modrich et al. |
| 10,131,890 B2 | 11/2018 | Matsumura et al. |
| 10,196,618 B1 | 2/2019 | Matsumura et al. |
| 10,280,412 B2 | 5/2019 | Matsumura et al. |
| 10,294,465 B2 | 5/2019 | Matsumura et al. |
| 10,975,415 B2 | 4/2021 | Uemori et al. |
| 2016/0017300 A1 | 1/2016 | Matsumura et al. |
| 2017/0253909 A1 | 9/2017 | Uemori et al. |
| 2018/0163263 A1 | 6/2018 | Uemori et al. |
| 2019/0017037 A1 | 1/2019 | Matsumura et al. |
| 2019/0085307 A1 | 3/2019 | Matsumura et al. |
| 2019/0100736 A1 | 4/2019 | Matsumura et al. |

FOREIGN PATENT DOCUMENTS

| | | |
|---|---|---|
| EP | 2 975 124 | 1/2016 |
| JP | 6009649 | 10/2016 |
| WO | 01/62974 | 8/2001 |
| WO | 2014/142261 | 9/2014 |
| WO | 2016/039377 | 3/2016 |
| WO | 2016/152812 | 9/2016 |

OTHER PUBLICATIONS

International Search Report issued Jun. 1, 2021 in International (PCT) Application No. PCT/JP2021/011033, with English-language translation.
International Preliminary Report on Patentability dated Sep. 20, 2022 in International (PCT) Application No. PCT/JP2021/011033.
Zhulidov, Pavel A. et al., "Simple cDNA normalization using kamchatka crab duplex-specific nuclease", Nucleic Acids Research, 2004, vol. 32, No. 3, e37, pp. 1-8.
Hillmann, Andrew et al., "cDNA Amplification by SMART-PCR and Suppression Subtractive Hybridization (SSH)-PCR", Methods in Molecular Biology, 2009, vol. 496, No. 2, pp. 223-243.
Ward, Robyn et al., "Restriction Endonuclease-Mediated Selective Polymerase Chain Reaction: *A Novel Assay for the Detection of K-ras Mutations in Clinical Samples*", American Journal of Pathology, Aug. 1998, vol. 153, No. 2, pp. 373-379.
Ren, Bin et al., "Structure and function of a novel endonuclease acting on branched DNA substrates", The EMBO Journal, 2009, vol. 28, No. 16, pp. 2479-2489.
Extended European Search Report issued Mar. 14, 2024 in corresponding European Patent Application No. 21772153.9.
Sonoko Ishino et al., "Identification of a mismatch-specific endonuclease in hyperthermophilic Archaea", Nucleic Acids Research, vol. 44, No. 7, pp. 2977-2986, 2016.

*Primary Examiner* — Maryam Monshipouri
(74) *Attorney, Agent, or Firm* — Wenderoth, Lind & Ponack, L.L.P.

(57) ABSTRACT

The present invention provides a GG-specific mismatch endonuclease variant, a TT-specific mismatch endonuclease variant, and a GT/TG-specific mismatch endonuclease variant. The present invention also provides a mismatch specific cleaving reaction using said variant, a method for removing errors in a nucleic acid amplification reaction using a mismatch nuclease, a method for suppressing amplification of a nucleic acid having a specific base sequence during a nucleic acid amplification reaction, and a method for detecting a nucleic acid having a single base polymorphic mutation using said suppression method.

19 Claims, No Drawings
Specification includes a Sequence Listing.

HEAT RESISTANT MISMATCH ENDONUCLEASE VARIANT

TECHNICAL FIELD

The present invention relates to a heat-resistant mismatch endonuclease mutant which recognizes and cleaves a mismatched base pair (hereinafter, also merely referred to as a mismatch) in a double-stranded nucleic acid, a composition comprising the mismatch endonuclease mutant, and a method of using the mismatch endonuclease mutant.

BACKGROUND ART

In recent years, biotechnology has been remarkably developed. Particularly, in consequence of large-scale genomic analyses accompanying advances in genomic analysis techniques, enormous information of genome sequences has been accumulated. In addition, based on combinations of the above-mentioned information with analyses of various physiological functions, many functional genetic mutations have been found. Analyses of these mutations have been used for genetic diagnoses of human beings as well as improvement of agricultural crops and isolation or creation of useful microorganisms, and thus have greatly contributed to general living.

The mutation analyses have been performed by direct analyses of genomic sequences or by use of enzymes that recognize mismatched base pairs. A mutation analysis method comprises detection with a factor capable of binding specifically to a mismatched base pair formed by paring of a mutant-type DNA and a wild-type DNA. A representative example of the mutation analysis method includes detection of mutation sites by use of MutS, MutT, and MutL complexes from *Escherichia coli* (Patent Literature 1).

A mutation analysis method comprising use of a mismatch endonuclease which specifically cleaves mismatch sites is also known. In this method, a mismatch endonuclease is used to cleave a DNA in the vicinity of a mismatched base pair, and the DNA fragments thus obtained are analyzed to detect the presence or absence and the position of mutations. As a representative example, a method comprising use of a cell gene product from celery is known (Patent Literature 2), and the method is actually used for analyses of base mutations. However, the enzyme is not heat-resistant, and therefore cannot be used in techniques involving a high-temperature reaction process, such as PCR. Thus, in order to detect base mutations, the method requires four steps of amplification, formation of mismatches, cleavage of mismatches, and detection.

Other examples of mismatch endonuclease include mismatch endonucleases from *Pyrococcus furiosus, Methanocaldococcus jannaschii, Thermococcus barophylus,* and *Thermococcus kodakarensis* (Patent Literatures 3 and 4). However, these mismatch endonucleases recognize and cleave a plurality of mismatches, and therefore have a problem in recognition of mismatches (substrate specificity).

In some cases, the substrate specificity of a mismatch endonuclease is not suitable for a genetic mutation to be detected, and thus the genetic mutation cannot be analyzed. In such cases, there is no other choice than addition of an appropriately designed nucleic acid called a suppressive oligonucleotide to a reaction system to specifically detect the genetic mutation (Patent Literature 5).

In addition to mutation analyses, examples of biotechnological techniques that have a lot of influences include nucleic acid amplification techniques. A representative example of the nucleic acid amplification techniques is polymerase chain reaction (PCR). PCR is a technique for easily amplifying a desired nucleic acid fragment in vitro. PCR is an experimental technique which is essential in broad fields including the fields of biology, medicine, and agriculture, as well as research regarding genes. PCR is also applied to detection of mutated genes and analysis of methylation of DNA. Isothermal nucleic acid amplification methods such as a LAMP method and an ICAN method do not require special equipment, and therefore they are used as cheaper methods for detection of nucleic acids. For structural analyses of the whole genome which have been performed in recent years, a whole-genome amplification method is an important technique, in particular for analyses of scarce samples.

In these nucleic acid amplification methods, incorporation of incorrect bases occurs with a constant probability. The probability has been reduced through improvement of a polymerase or the like. However, the incorporation of incorrect bases still disturbs precise analyses.

The nucleic acid amplification techniques are used not only for amplification of a DNA having a specific nucleotide sequence but also for amplification of a mixture of DNAs having a common nucleotide sequence region at both ends. Specific examples of such nucleic acid amplification techniques include construction of genomic libraries or cDNA libraries. In constructing such libraries, however, a DNA molecule with a higher content is preferentially amplified, which may disturb analyses or screening of various kinds of DNAs.

To solve the above problem, the proportion of a DNA with a higher content is reduced by normalization utilizing self-hybridization (Non-patent Literature 1). SSH-PCR in which PCR and self-hybridization are combined is also used (Non-patent Literature 2). Using these methods, however, DNAs homologous to the DNA with a higher content may be also removed.

In detection of a DNA by a nucleic acid amplification method, a target DNA and a non-target DNA may compete for amplification. In other words, when a non-target DNA is amplified simultaneously with amplification of a target DNA, it is difficult to detect the target DNA. The above problem may be solved by use of real-time PCR in which probes such as cycling probes or TaqMan probes are used to detect only a target DNA. In the case where a non-target DNA exists in an excessively large amount relative to a target DNA, however, it is difficult to detect the target DNA because of false-positive reaction with the non-target DNA.

Such a problem may occur, for example, in detection of a small number of mutant alleles in the presence of normal alleles (for example, detection of circulating tumor genes), detection of a small number of methylated or non-methylated alleles by epigenetic assay, detection of a small amount of fetal DNA sequences circulating in the mother's blood, and the like.

To solve the above problem, a method called enrichment PCR or restriction endonuclease-mediated selective polymerase chain reaction (REMS PCR) has been developed (Non-patent Literature 3). This method involves use of a heat-resistant restriction enzyme. In this method, a DNA having a mutated nucleotide sequence is selectively detected using primers which, for example, are designed so that cleavage by the restriction enzyme occurs only when a template has a normal nucleotide sequence. Depending on a target DNA to be detected, however, there may be no heat-resistant restriction enzyme having a recognition sequence suitable to detection by REMS PCR.

CITATION LIST

Patent Literature

Patent Literature 1: U.S. Pat. No. 5,922,539 B
Patent Literature 2: WO 01/062974
Patent Literature 3: WO 2014/142261
Patent Literature 4: WO 2016/039377
Patent Literature 5: WO 2016/152812

Non Patent Literature

Non-Patent Literature 1: "Nucleic Acids Research", 2004 February, vol. 32, No. 3, e37
Non-Patent Literature 2: "Methods in Molecular Biology", 2009, vol. 496, No. 2, pp. 223-243
Non-Patent Literature 3: "American Journal of Pathology", 1998 August, vol. 153, No. 2, pp. 373-379

SUMMARY OF INVENTION

Technical Problems

Objectives of the present invention include provision of a heat-resistant mismatch endonuclease mutant having improved specificity for a mismatch as compared with a conventional mismatch endonuclease, a composition comprising the mismatch endonuclease mutant, and a method of using the mismatch endonuclease mutant.

Solution to Problems

As a result of intensive efforts under the above circumstances, the present inventors succeeded in producing a mismatch endonuclease mutant capable of specifically cleaving a G-G mismatch and a mismatch endonuclease mutant capable of specifically cleaving a T-T mismatch. In addition, the present inventors succeeded in connecting two monomers respectively from the above-mentioned two mutants with a linker, though a mismatch endonuclease is originally a homodimer, to produce a mismatch endonuclease mutant capable of specifically cleaving a G-T/T-G mismatch. Thus, the present invention was completed.

Specifically, the first aspect of the present invention provides:

[1] A polypeptide represented by the following (A) or (B):
(A) a polypeptide selected from the group consisting of the following (1) to (4), and having an activity of cleaving a nucleic acid chain having guanine (G) forming a mismatched base pair in a double-stranded nucleic acid:
 (1) a polypeptide comprising an amino acid sequence comprising a substitution of a basic amino acid residue for serine at position 47 and a substitution of an acidic amino acid residue for asparagine at position 76 in an amino acid sequence set forth in SEQ ID NO: 1;
 (2) a polypeptide comprising an amino acid sequence comprising mutations of further one to ten amino acid residues in the substituted amino acid sequence described in (1), wherein the mutations are substitution, deletion, insertion and/or addition and the amino acid substitutions in the substituted amino acid sequence described in (1) are retained;
 (3) a polypeptide comprising an amino acid sequence having 50% or more homology to the substituted or mutated amino acid sequence described in (1) or (2), wherein the amino acid substitutions or mutations in the substituted or mutated amino acid sequence described in (1) or (2) are retained; and
 (4) a polypeptide comprising an amino acid sequence having 50% or more identity to the substituted or mutated amino acid sequence described in (1) or (2), wherein the amino acid substitutions or mutations in the substituted or mutated amino acid sequence described in (1) or (2) are retained; or
(B) a polypeptide selected from the group consisting of the following (5) to (8), and having an activity of cleaving a nucleic acid chain having thymine (T) forming a mismatched base pair in a double-stranded nucleic acid:
 (5) a polypeptide comprising an amino acid sequence comprising a substitution of a basic amino acid residue for glutamine at position 78 and a substitution of a neutral (polar, uncharged) amino acid residue or a sulfur-containing amino acid residue for leucine at position 123 or of a hydrophobic amino acid residue or a sulfur-containing amino acid residue for leucine at position 125 in an amino acid sequence set forth in SEQ ID NO: 1;
 (6) a polypeptide comprising an amino acid sequence comprising mutations of further one to ten amino acid residues in the substituted amino acid sequence described in (5), wherein the mutations are substitution, deletion, insertion and/or addition and the amino acid substitutions in the substituted amino acid sequence described in (5) are retained;
 (7) a polypeptide comprising an amino acid sequence having 50% or more homology to the substituted or mutated amino acid sequence described in (5) or (6), wherein the amino acid substitutions or mutations in the substituted or mutated amino acid sequence described in (5) or (6) are retained; and
 (8) a polypeptide comprising an amino acid sequence having 50% or more identity to the substituted or mutated amino acid sequence described in (5) or (6), wherein the amino acid substitutions or mutations in the substituted or mutated amino acid sequence described in (5) or (6) are retained;

[2] The polypeptide according to [1], wherein the basic amino acid residue is lysine, arginine, or histidine,
the acidic amino acid residue is aspartic acid or glutamic acid,
the neutral (polar, uncharged) amino acid is threonine, serine, asparagine, glutamine, tyrosine, or cysteine,
the sulfur-containing amino acid is cysteine or methionine, and
the hydrophobic (non-polar) amino acid is alanine, glycine, valine, leucine, isoleucine, proline, tryptophan, phenylalanine, or methionine;

[3] The polypeptide according to [1] or [2], which comprises an amino acid sequence selected from SEQ ID NOs: 6 to 15;

[4] A nucleic acid encoding the polypeptide according to any one of [1] to [3];

[5] The nucleic acid according to [4], which comprises a nucleotide sequence selected from SEQ ID NOs: 21 to 30;

[6] An expression vector comprising the nucleic acid according to [4] or [5] and an expression regulatory sequence;

[7] A cell transformed with the expression vector according to [6], expressing a polypeptide having a mismatch endonuclease activity;

[8] A method for cleaving a double-stranded nucleic acid having a mismatch, the method comprising a step of treating the double-stranded nucleic acid with the polypeptide according to any one of [1] to [3];

[9] A composition comprising the following (a) to (d):
(a) the polypeptide according to any one of [1] to [3];
(b) an oligonucleotide that forms a double-stranded nucleic acid containing at least one mismatch when hybridized with a non-target nucleic acid, wherein the double-stranded nucleic acid is cleaved by the polypeptide of (a), and forms a double-stranded nucleic acid that is not cleaved by the polypeptide of (a) when hybridized with a target nucleic acid;
(c) at least one pair of oligonucleotide primers; and
(d) a polypeptide having a DNA polymerase activity;

[10] A method for amplifying a nucleic acid, the method comprising the following steps (1) and (2):
(1) a step of preparing a composition comprising a nucleic acid molecule as a template and the following (a) to (d);
(a) the polypeptide according to any one of [1] to [3];
(b) an oligonucleotide that forms a double-stranded nucleic acid containing at least one mismatch when hybridized with a non-target nucleic acid, wherein the double-stranded nucleic acid is cleaved by the polypeptide of (a), and forms a double-stranded nucleic acid that is not cleaved by the polypeptide of (a) when hybridized with a target nucleic acid;
(c) at least one pair of oligonucleotide primers; and
(d) a polypeptide having a DNA polymerase activity; and
(2) a step of reacting the composition obtained in step (1) under appropriate conditions to perform nucleic acid amplification;

[11] The method according to [10], wherein the nucleic acid amplification is performed by a polymerase chain reaction (PCR) method, an isothermal nucleic acid amplification method, or a multiple displacement amplification (MDA) method;

[12] A method for suppressing amplification of a nucleic acid comprising a specific nucleotide sequence, the method comprising a step of performing a nucleic acid amplification reaction in the presence of the following (a) to (d):
(a) an oligodeoxynucleotide designed to produce one or several mismatches when hybridized with the nucleic acid comprising a specific nucleotide sequence or a complementary strand thereof;
(b) a DNA polymerase;
(c) at least one pair of oligonucleotide primers; and
(d) the polypeptide according to any one of [1] to [3];

[13] The method according to [12], wherein the nucleic acid amplification reaction is polymerase chain reaction (PCR) or isothermal nucleic acid amplification;

[14] A method for preferentially amplifying a target DNA, the method comprising suppressing amplification of a DNA having a nucleotide sequence that differs from the target DNA by one or several nucleotides by the method according to [12] or [13];

[15] The method according to [14], which is used for amplifying one of a DNA having a wild-type nucleotide sequence and a DNA that differs from the wild-type DNA by a single nucleotide polymorphism mutation distinctively from the other;

[16] The method according to [15], wherein the single nucleotide polymorphism mutation is a single nucleotide polymorphism mutation that correlates with canceration or a therapeutic effect of a therapeutic agent for cancer; and

[17] A polypeptide in a dimer-form, selected from a group consisting of:
(1) a homodimer having the polypeptide according to claim 1 (A) as a subunit,
(2) a homodimer having the polypeptide according to claim 1 (B) as a subunit, and
(3) a heterodimer having the polypeptide according to [1] (A) and the polypeptide according to [1] (B) as subunits.

Effects of the Invention

According to the present invention, a heat-resistant mismatch endonuclease mutant which has great utility in biotechnology, a composition comprising the mismatch endonuclease mutant, and a method of using the mismatch endonuclease mutant are provided.

DESCRIPTION OF EMBODIMENTS

As used herein, the term "mismatch" refers to base pairings different from Watson-Crick base pairs present in double-stranded nucleic acids, in other words, pairing of bases in combinations other than base pairings of G (guanine base)—C (cytosine base), and A (adenine base)—T (thymine base) or U (uracil base).

As used herein, the term "GG-specific" means having specificity for a G-G mismatch, the term "TT-specific" means having specificity for a T-T mismatch, and the term "GT/TG-specific" means having specificity for a G-T or T-G mismatch. In other words, these terms mean that substantially recognizing nothing other than the indicated mismatches.

As used herein, the term "a polypeptide having a mismatch endonuclease activity (sometimes, merely referred to as a mismatch endonuclease) means a nuclease having an activity of cleaving mismatch sites present in double-stranded nucleic acids. The mismatch endonuclease activity includes an activity of cleaving phosphodiester bonds adjacent to nucleotides forming mismatched base pairs, and an activity of cleaving phosphodiester bonds adjacent to nucleotides located 1 to 5, preferably 1 to 3 base pairs away from mismatched base pairs. In the present invention, the mismatch endonuclease is preferably a nuclease having an activity of specifically recognizing a specific mismatched base pair in a double-stranded nucleic acid to cleave the double-stranded nucleic acid. As used herein, the heat-resistant mismatch endonuclease means a nuclease having an activity of cleaving mismatch sites present in double-stranded nucleic acids at temperature of 50° C. or higher. In the present invention, a heat-resistant mismatch endonuclease is preferably used.

The mismatch endonuclease in the present invention is an enzyme that forms a dimer to exhibit the activity. It is known that when a monomer (also called a "subunit" which means a component of a dimer) of the protein is expressed in a host such as *Escherichia coli* or the like, the monomers naturally associate to form a dimer (homodimer). As used herein, the polypeptide "having an activity of cleaving a nucleic acid chain having guanine (G) forming a mismatched base pair in a double-stranded nucleic acid" and the polypeptide "having an activity of cleaving a nucleic acid chain having thymine (T) forming a mismatched base pair in a double-stranded nucleic acid" mean the monomers.

Amino acids are classified into hydrophilic (polar) amino acids and hydrophobic (nonpolar) amino acids based on their chemical properties.

Hydrophilic (polar) amino acids include acidic amino acids, basic amino acids, neutral (polar, uncharged) amino acids, tyrosine among aromatic ring-containing amino acids, and cysteine among sulfur-containing amino acids.

Hydrophobic (nonpolar) amino acids include amino acids having aliphatic side chains, tryptophan and phenylalanine among aromatic ring-containing amino acids, and methionine among sulfur-containing amino acids.

Acidic amino acids include aspartic acid (Asp, D) and glutamic acid (Glu, E).

Basic amino acids include lysine (Lys, K), arginine (Arg, R), and histidine (His, H).

Neutral (polar, uncharged) amino acids include threonine (Thr, T), serine (Ser, S), asparagine (Asn, N), glutamine (Gln, Q), tyrosine (Tyr, Y), and cysteine (Cys).

Aromatic ring-containing amino acids include tyrosine (Tyr, Y), tryptophan (Trp, W), and phenylalanine (Phe, F).

Sulfur-containing amino acids include cysteine (Cys, C) and methionine (Met, M).

Amino acids having aliphatic side chains include alanine (Ala, A), glycine (Gly, G), valine (Val, V), leucine (Leu, L), isoleucine (Ile, I), and proline (Pro, P). Proline is an imino acid with a cyclized side chain.

As used herein, "similar amino acids" refer to amino acids classified into the same group based on the chemical properties as mentioned above. For example, lysine, arginine, and histidine are classified as basic amino acids, and thus they are similar amino acids to one another.

As used herein, "homology of amino acid sequences" means homology or similarity between polypeptide sequences in consideration of the above-mentioned similar amino acids. Amino acids classified into the same group based on the chemical properties of amino acids as mentioned above are regarded as "homologous".

As used herein, "identity of amino acid sequences" means identity between polypeptide sequences in no consideration of the above-mentioned similar amino acids. As used herein, "identity of nucleotide sequences" means identity between polynucleotide sequences.

Known programs can be used to calculate scores for the amino acid sequence homology, the amino acid sequence identity, and the nucleotide sequence identity. Examples of the programs include, but not limited to, BLAST, BLAT, FASTA, SSEARCH, and MPsrch.

Amino acid numbers (also referred to as amino acid positions) as used herein are based on the amino acid sequence of SEQ ID NO: 1. Therefore, positions of amino acids indicated by amino acid numbers as used herein may be different from positions indicated by the same amino acid numbers when counted from N-terminals in homologous proteins derived from other organisms or mutant proteins of the polypeptide of SEQ ID NO: 1. In other words, a "position corresponding to position 47 in an amino acid sequence of a wild-type mismatch endonuclease" as used herein refers to an amino acid residue regarded as being at the same position as position 47 in the wild-type amino acid sequence (SEQ ID NO: 1) when the wild-type amino acid sequence is compared to and aligned with mutant amino acid sequences or amino acid sequences of mismatch endonuclease derived from other organisms.

As used herein, the "target nucleic acid" or "target DNA" is a nucleic acid that is not cleaved by the mismatch endonuclease mutant of the present invention. In other words, the target nucleic acid or target DNA is a nucleic acid to be amplified (as a template) by the amplification method of the present invention. On the other hand, the "non-target nucleic acid" or "non-target DNA" is a nucleic acid that is cleaved by the mismatch endonuclease mutant of the present invention. In other words, the non-target nucleic acid or non-target DNA is a nucleic acid that is cleaved by the cleavage method of the present invention and thus not amplified by the amplification method of the present invention. The "target nucleic acid" or "target DNA" and the "non-target nucleic acid" or "non-target DNA" are not particularly limited and may be any nucleic acids that are desired to be distinguished from each other.

Hereinafter, the present invention will be described in detail.

1. Mismatch Endonuclease Mutant of the Present Invention

The first aspect of the present invention relates to mismatch endonuclease mutants, i.e., mismatch endonuclease mutants having altered substrate specificity. The mismatch endonuclease mutants are characterized by changes in an amino acid sequence of a site that contributes to substrate recognition and/or cleavage in a wild-type mismatch endonuclease from *Pyrococcus furiosus* (also referred to as PfuNucS) or a homolog thereof, or a mutant having a mismatch endonuclease activity of PfuNucS.

The mismatch endonuclease mutant of the present invention can be prepared, for example, by introducing amino acid substitutions into a polypeptide from *Pyrococcus furiosus*, PF_RS00065 (RefSeq ID: WP_11011124.1, SEQ ID NO: 1, former name: PF0012, former RefSeq ID: NP_577741), wherein the amino acid substitutions are (i) an amino acid substitution of a basic amino acid for serine at position 47 and an amino acid substitution of an acidic amino acid for asparagine at position 76, or (ii) an amino acid substitution of a basic amino acid for glutamine at position 78, and an amino acid substitution of a neutral (polar, uncharged) amino acid or a sulfur-containing amino acid for leucine at position 123 or of a hydrophobic amino acid or a sulfur-containing amino acid for leucine at position 125.

Further, the mismatch endonuclease mutant of the present invention can be also prepared by introducing mutations corresponding to the above-mentioned amino acid substitutions (i) or (ii) into polypeptide W77F (SEQ ID NO: 2) in which tryptophan at position 77 in PF_RS00065 is replaced by phenylalanine, polypeptide MJ RS01180 from *Methanocaldococcus jannaschii* (RefSeq ID: NP_247194, SEQ ID NO: 3, former name: MJ_0225) which is a homolog of PF_RS00065, polypeptide TERMP_01877 from *Thermococcus barophilus* (RefSeq ID: YP_004072075, SEQ ID NO: 4) which is a homolog of PF_RS00065, or a polypeptide (SEQ ID NO: 5) from *Thermococcus kodakarensis* strain KOD1 (JCM 12380T) which is a homolog of PF_RS00065.

The mismatch endonuclease mutant of the present invention is preferably a thermostable enzyme. For example, a polypeptide stably retaining the activity even in a thermal cycle such as PCR is preferably used in the method of the present invention. A polypeptide that is not inactivated even at 50° C. or higher, preferably 60° C. or higher, further preferably 70° C. or higher, and more preferably 70° C. or higher can be used in the method of the present invention.

For example, the mismatch endonuclease mutant of the present invention comprises a polypeptide shown in (A) and/or (B) as described below. Preferable examples of the mismatch endonuclease mutant of the present invention include mismatch endonuclease mutants consisting of the polypeptides shown in (A) and/or (B) as described below.

(A) A polypeptide selected from the group consisting of the following (1) to (4), and having an activity of cleaving a nucleic acid chain having guanine (G) forming a mismatched base pair in a double-stranded nucleic acid:

(1) a polypeptide comprising an amino acid sequence comprising a substitution of a basic amino acid residue for serine at position 47 and a substitution of an acidic amino acid residue for asparagine at position 76 in an amino acid sequence set forth in SEQ ID NO: 1;

(2) a polypeptide comprising an amino acid sequence comprising mutations of further one to ten amino acid residues in the substituted amino acid sequence described in (1), wherein the mutations are substitution, deletion, insertion and/or addition and the amino acid substitutions in the substituted amino acid sequence described in (1) are retained;

(3) a polypeptide comprising an amino acid sequence having 50% or more homology to the substituted or mutated amino acid sequence described in (1) or (2), wherein the amino acid substitutions or mutations in the substituted or mutated amino acid sequence described in (1) or (2) are retained; and (4) a polypeptide comprising an amino acid sequence having 50% or more identity to the substituted or mutated amino acid sequence described in (1) or (2), wherein the amino acid substitutions or mutations in the substituted or mutated amino acid sequence described in (1) or (2) are retained.

(B) A polypeptide selected from the group consisting of the following (5) to (8), and having an activity of cleaving a nucleic acid chain having thymine (T) forming a mismatched base pair in a double-stranded nucleic acid:

(5) a polypeptide comprising an amino acid sequence comprising a substitution of a basic amino acid residue for glutamine at position 78, and a substitution of a neutral (polar, uncharged) amino acid residue or a sulfur-containing amino acid residue for leucine at position 123 or of a hydrophobic amino acid residue or a sulfur-containing amino acid residue for leucine at position 125 in an amino acid sequence set forth in SEQ ID NO: 1;

(6) a polypeptide comprising an amino acid sequence comprising mutations of further one to ten amino acid residues in the substituted amino acid sequence described in (5), wherein the mutations are substitution, deletion, insertion and/or addition and the amino acid substitutions in the substituted amino acid sequence described in (5) are retained;

(7) a polypeptide comprising an amino acid sequence having 50% or more homology to the substituted or mutated amino acid sequence described in (5) or (6), wherein the amino acid substitutions or mutations in the substituted or mutated amino acid sequence described in (5) or (6) are retained; and (8) a polypeptide comprising an amino acid sequence having 50% or more identity to the substituted or mutated amino acid sequence described in (5) or (6), wherein the amino acid substitutions or mutations in the substituted or mutated amino acid sequence described in (5) or (6) are retained.

The present invention provides polypeptides having GG-specific mismatch endonuclease activity. Examples of the polypeptides having GG-specific mismatch endonuclease activity include, but not limited to, polypeptides shown in (A) as described above. Preferable examples of the polypeptides having GG-specific mismatch endonuclease activity include, but not limited to, polypeptides comprising an amino acid sequence comprising a substitution of a basic amino acid residue for serine at position 47 and a substitution of an acidic amino acid residue for asparagine at position 76 in an amino acid sequence set forth in SEQ ID NO: 1, as described in above (A) (1). Further examples of the polypeptides having GG-specific mismatch endonuclease activity include polypeptides comprising an amino acid sequence comprising a substitution of an amino acid having an aliphatic side chain for leucine at position 123 as well as the above-mentioned amino acid substitutions at position 47 and position 76 in SEQ ID NO: 1. Further preferable examples of the polypeptides having GG-specific mismatch endonuclease activity include polypeptides comprising an amino acid sequence comprising a substitution of lysine, arginine or histidine for serine at position 47 and a substitution of aspartic acid or glutamic acid for arginine at position 76 in an amino acid sequence of SEQ ID NO: 1. Further preferable examples of the polypeptides having GG-specific mismatch endonuclease activity also include polypeptides comprising an amino acid sequence comprising a substitution of alanine, glycine, valine, leucine, isoleucine or proline for leucine at position 123 as well as the above-mentioned amino acid substitutions at position 47 and position 76 in SEQ ID NO: 1.

Further, the present invention provides polypeptides having TT-specific mismatched endonuclease activity. Examples of the polypeptides having TT-specific mismatch endonuclease activity include, but not limited to, polypeptides shown in (B) as described above. Preferable examples of the polypeptides having TT-specific mismatch endonuclease activity include, but not limited to, polypeptides comprising an amino acid sequence comprising a substitution of a basic amino acid residue for glutamine at position 78, and a substitution of a neutral (polar, uncharged) amino acid residue or a sulfur-containing amino acid residue for leucine at position 123 or of a hydrophobic amino acid residue or a sulfur-containing amino acid residue for leucine at position 125 in an amino acid sequence set forth in SEQ ID NO: 1, as described in above (B) (5). Further preferable examples of the polypeptides having TT-specific mismatch endonuclease activity include polypeptides comprising an amino acid sequence comprising a substitution of lysine, arginine or histidine for glutamine at position 78, and a substitution of threonine, serine, asparagine, glutamine, tyrosine, cysteine or methionine for leucine at position 123 or of alanine, glycine, valine, isoleucine, proline, tryptophan, phenylalanine, cysteine or methionine for leucine at position 125 in an amino acid sequence of SEQ ID NO: 1. In a further preferable example of the polypeptide having TT-specific mismatch endonuclease activity, leucine at position 125 may be replaced by an amino acid having an aliphatic side chain other than leucine.

The polypeptide having GG-specific mismatch endonuclease activity and the polypeptide having TT-specific mismatch endonuclease activity may be in the form of a homodimer. When the polypeptide having GG-specific mismatch endonuclease activity is expressed as monomers in a host such as *Escherichia coli* or the like, the monomers naturally associate to form dimers (homodimers) and thus exhibit the activity. The same holds for the polypeptide having TT-specific mismatch endonuclease activity.

Further, the present invention also provides polypeptides having GT/TG-specific mismatch endonuclease activity. Examples of the polypeptides having GT/TG-specific mismatch endonuclease activity include, but not limited to, heterodimer proteins comprising the polypeptides shown in above (A) and the polypeptides shown in above (B). Preferable examples of the polypeptides having GT/TG-specific mismatch endonuclease activity include, but not limited to, heterodimer proteins comprising the polypeptide having GG-specific mismatch endonuclease activity and the polypeptide having TT-specific mismatch endonuclease activity.

The heterodimer protein can be produced by expressing the polypeptide having GG-specific mismatch endonuclease activity and the polypeptide having TT-specific mismatch endonuclease activity in a host such as *Escherichia coli* or the like so as to form a dimer (heterodimer). However, a method for producing the heterodimer protein is not limited. After the polypeptide having GG-specific mismatch endonuclease activity and the polypeptide having TT-specific mismatch endonuclease activity are expressed separately and then dissociated into monomers by any method, the monomers of both polypeptides may be mixed to allow to be reassociated. In a preferred method for producing the heterodimer protein, the polypeptide having GG-specific mismatch endonuclease activity and the polypeptide having TT-specific mismatch endonuclease activity are expressed as a single polypeptide via a linker. An arrangement of the polypeptide having GG-specific mismatch endonuclease activity and the polypeptide having TT-specific mismatch endonuclease activity within the single polypeptide is not limited. They may be arranged in the order of [the polypeptide having GG-specific mismatch endonuclease activity]-[linker]-[the polypeptide having TT-specific mismatch endonuclease activity] or [the polypeptide having TT-specific mismatch endonuclease activity]-[linker]-[the polypeptide having GG-specific mismatch endonuclease activity]. The linker is preferably a peptide linker. The amino acid sequence and the number of residues (length) of the peptide linker are not limited, as long as the linker does not inhibit the heterodimerization and the cleavage of the double-stranded nucleic acid. Furthermore, a recognition sequence for protease for cleavage of fusion polypeptide, such as Factor Xa, PreScission protease, thrombin, enterokinase, TEV protease (tobacco etch virus protease) or the like may be present between the polypeptide having mismatch endonuclease activity and the linker.

The mismatch endonuclease mutant of the present invention may comprise, in addition to the above-mentioned amino acid substitutions described in (A) (1) and (B) (5), a mutation at another amino acid position as long as the mismatch endonuclease mutant does not lose the substrate specificity (the specificity for a GG, TT, or GT/TG mismatch). Examples of the mutation at another amino acid position include, but not limited to, a mutation that increases heat resistance, a mutation that increases resistance to an inhibitor, and a mutation that improves the property of mismatch endonuclease, as long as the substrate specificity of the mismatch endonuclease mutant of the present invention is maintained. As used herein, the "mutation" may be any of substitution, insertion, deletion, or addition of an amino acid.

For example, the mismatch endonuclease mutant of the present invention comprising a mutation at another amino acid position may comprise an amino acid sequence comprising mutations of further 1 to 10 amino acid residues in addition to the amino acid substitutions described above in (A) (1) and (B) (5).

Further, for example, the mismatch endonuclease mutant of the present invention comprising a mutation at another amino acid position may comprise an amino acid sequence having 50% or more homology to an amino acid sequence of SEQ ID NO: 1 comprising the amino acid substitutions described above in (A) (1) and (B) (5) or to an amino acid sequence of SEQ ID NO: 1 comprising the amino acid substitutions described above in (A) (1) and (B) (5) and mutations of further one to ten amino acid residues. The 50% or more homology includes for example 50% or more, 55% or more, 60% or more, 65% or more, 70% or more, or 75% or more, preferably 80% or more, more preferably 85% or more, further more preferably 90% or more, and even more preferably 95% or more, 96% or more, 97% or. more, 98% or more or 99% or more amino acid sequence homology.

Further, for example, the mismatch endonuclease mutant of the present invention comprising a mutation at another amino acid position may comprise an amino acid sequence having 50% or more identity to an amino acid sequence of SEQ ID NO: 1 comprising the amino acid substitutions described above in (A) (1) and (B) (5) or to an amino acid sequence of SEQ ID NO: 1 comprising the amino acid substitutions described above in (A) (1) and (B) (5) and mutations of further one to ten amino acid residues. The 50% or more identity includes for example 50% or more, 55% or more, 60% or more, 65% or more, 70% or more, or 75% or more, preferably 80% or more, more preferably 85% or more, further preferably comprises 90% or more, and even more preferably 95% or more, 96% or more, 97% or more, 98% or more, or 99% or more amino acid sequence identity.

Further, the present invention includes the mismatch endonuclease mutant comprising an affinity tag added to the N-terminal or C-terminal for the purpose of facilitating purification. The affinity tag may be a known affinity tag, and examples thereof include a histidine (His) tag consisting of 4 to 8 consecutive His residues, a Flag tag, an HA tag, a c-myc tag, a glutathione S-transferase (GST) tag, a maltose binding protein (MBP) tag, and a Strep (II) tag consisting of 8 amino acid residues (Trp-Ser-His-Pro-Gln-Phe-Glu-Lys). The tag may be linked to the mutant of the present invention optionally via a linker comprising 1 to 15 amino acids. Furthermore, a recognition sequence of a protease for fusion polypeptide cleavage may be present between the polypeptide having a mismatch endonuclease activity and the linker. Examples of the protease include Factor Xa, PreScission protease, thrombin, enterokinase, and TEV protease (tobacco etch virus protease). Thus, such a polypeptide comprising the affinity tag, the linker, and/or the recognition sequence of a protease for fusion polypeptide cleavage is also an example of the mismatch endonuclease mutant of the present invention comprising a mutation at another amino acid position. For example, the mismatch endonuclease mutant of the present invention comprising a mutation at another amino acid position may comprise the affinity tag, the linker, and/or the recognition sequence of a protease for fusion polypeptide cleavage within the range of the mutated amino acid residue number of one to ten, the amino acid homology, or the amino acid identity as described above.

The mismatch endonuclease mutant of the present invention may comprise an artificial amino acid (also referred to as an unnatural amino acid). Examples of the artificial amino acid include halogenated (chloro, bromo, iodo) tyrosine, tyrosine sulfate, azidotyrosine, acetyllysine, azidophenylalanine, and fluorophenylalanine. A method for replacing a natural amino acid with an artificial amino acid is not particularly limited, and a known method can be used.

Examples of the mismatch endonuclease mutant of the present invention include, but not limited to, a mutant consisting of any of amino acid sequences set forth in SEQ ID NOs: 6 to 15.

Such a mismatch endonuclease mutant of the present invention is suitable for various uses as described later, for example, use in a method of excluding a DNA comprising a specific DNA sequence and amplifying and detecting other DNAs.

The activity of mismatch endonuclease can be measured using a double-stranded nucleic acid containing a mismatch as a substrate. Specifically, the activity is measured by reacting a mismatch endonuclease with an excess amount of a double-stranded nucleic acid containing a mismatch and then measuring the amount of cleaved nucleic acid per unit time. The cleaved double-stranded nucleic acid can be quantified separately from the nucleic acid that has not been cleaved by electrophoresis or the like. The double-stranded nucleic acid may be double-labeled with a fluorescent substance and a quencher so that an increase in fluorescence intensity can be detected only when cleaved. The activity measurement is facilitated by determining fluorescence intensity in a reaction solution at appropriate time intervals using the double-labeled double-stranded nucleic acid. It is also possible to investigate the cleavage activity targeting a specific mismatch by changing a mismatched base pair in the double-stranded nucleic acid as a substrate.

2. Nucleic Acid Encoding Mismatch Endonuclease Mutant of the Present Invention

The present invention provides a nucleic acid encoding a mismatch endonuclease mutant. Specifically, a nucleic acid encoding the above-mentioned mismatch endonuclease mutant of the present invention is provided.

Examples of the nucleic acid encoding the mismatch endonuclease mutant of the present invention include, but not limited to, nucleic acids comprising nucleotide sequences encoding the amino acid sequences set forth in SEQ ID NOs: 6 to 15. Preferred examples of the nucleic acid encoding the mismatch endonuclease mutant of the present invention include nucleic acids comprising nucleotide sequences encoding the amino acid sequences set forth in SEQ ID NOs: 21 to 30.

As examples of the mismatch endonuclease mutant of the present invention, which the present invention is not limited to, the amino acid sequences of the polypeptides prepared in Examples and nucleic acid sequences encoding them are shown in Table 1.

TABLE 1

| Mutant name | Amino acid SEQ No. | Nucleotide SEQ No. |
| --- | --- | --- |
| S47K + N76D | SEQ ID NO: 6 | SEQ ID NO: 21 |
| S47R + N76D + L123A | SEQ ID NO: 7 | SEQ ID NO: 22 |
| S47R + N76D + L123G | SEQ ID NO: 8 | SEQ ID NO: 23 |
| Q78R + L123S | SEQ ID NO: 9 | SEQ ID NO: 24 |
| Q78R + L123T | SEQ ID NO: 10 | SEQ ID NO: 25 |
| Q78R + L123M | SEQ ID NO: 11 | SEQ ID NO: 26 |
| Q78R + L123C | SEQ ID NO: 12 | SEQ ID NO: 27 |
| Q78R + L125V | SEQ ID NO: 13 | SEQ ID NO: 28 |
| Q78R + L125A | SEQ ID NO: 14 | SEQ ID NO: 29 |
| GT/TG specific heterodimer | SEQ ID NO: 15 | SEQ ID NO: 30 |

The nucleic acid encoding the mismatch endonuclease mutant of the present invention is not particularly limited as long as it is composed of codons encoding a protein that can be expressed in a host used and has a reverse transcriptase activity. The nucleic acid may be subjected to codon optimization to allow the expression in the host or to increase the expression level. The codon optimization is preferably performed by a method commonly used in the art.

3. Expression Vector Containing Nucleic Acid Encoding Mismatch Endonuclease Mutant of the Present Invention The expression vector of the present invention contains a nucleic acid encoding the mismatch endonuclease mutant of the present invention, and an expression regulatory sequence operably linked to the nucleic acid.

The expression vector used in the present invention may be an expression vector usually used in the art, and is not particularly limited. A vector capable of autonomously replicating in a host cell, or a vector capable of being integrated into a host chromosome can be used. A vector compatible with the host may be used.

Examples of the expression vector into which a nucleic acid encoding the mismatch endonuclease mutant of the present invention is inserted include a plasmid vector, a phage vector, and a viral vector. The plasmid vector may be a plasmid suitable for a host to be used, and examples of such a plasmid include a plasmid derived from *Escherichia coli*, a plasmid derived from a bacterium belonging to the genus *Bacillus*, and a plasmid derived from yeast. Such plasmid vectors are well known to those skilled in the art, and there are many commercially available plasmid vectors. Such known plasmids and altered plasmids thereof can be used in the present invention. The phage vector may be, for example, λ phage or the like. The viral vector may be, for example, an animal virus such as a retrovirus or a vaccinia virus, or an insect virus such as a baculovirus. Furthermore, many heterologous protein expression systems using yeast, insect cells and mammalian cells as hosts have been constructed, and are already commercially available. Such expression systems may be used in production of the mismatch endonuclease mutant of the present invention.

A promoter to be contained in the expression vector of the present invention can be selected depending on the host. For example, for *Escherichia coli*, a promoter derived from *Escherichia coli* or phage or an altered promoter thereof including, but not limited to, trp promoter, lac promoter, PL promoter and PR promoter, can be used. Further, an expression system containing a phage-derived promoter and a phage-derived RNA polymerase gene in combination (for example, a pET expression system, etc.) may be used.

To facilitate purification of the expressed polypeptide, the expression vector of the present invention may further contain a nucleic acid encoding an affinity tag. The nucleic acid encoding an affinity tag is inserted into the vector so that a fusion protein of the mismatch endonuclease mutant of the present invention and the affinity tag can be expressed. Examples of the affinity tag include, but not limited to, a histidine (His) tag, a glutathione S-transferase (GST) tag, a maltose binding protein (MBP) tag, and a Strep (II) tag consisting of 8 amino acid residues (Trp-Ser-His-Pro-Gln-Phe-Glu-Lys). The tag may be added to either the 5'end side and/or the 3'end side of the nucleic acid encoding the mismatch endonuclease mutant of the present invention. The tag may be appropriately added to a position that does not interfere with the expression and the tag function. The tag is preferably a tag that can be cleaved during or after purification of the expressed polypeptide. Examples of such a tag that can be cleaved include, but not limited to, tags comprising nucleic acids encoding recognition sequences of proteases for cleavage of fusion polypeptides, such as Factor Xa, PreScission protease, thrombin, enterokinase, and TEV protease (tobacco etch virus protease).

The expression vector of the present invention further contains one or more expression regulatory sequences. Examples of the expression regulatory sequence include, but not limited to, a promoter, a gene involved in regulation of a promoter, a ribosome binding sequence, a polyadenylation signal, a transcription termination sequence (transcription terminator), and an enhancer. The expression vector of the present invention may further contain a gene encoding an origin of replication or a marker (drug resistance gene, fluorescence marker, or luminescence marker) used for selection of transformants, and a nucleotide sequence for enhancing translation efficiency.

4. Cells Transformed with Expression Vector of the Present Invention

Cells (hosts) to be transformed with the vector for expressing the mismatch endonuclease mutant of the present invention may be hosts commonly used in the art, and are not particularly limited. Examples thereof include bacteria (*E. coli, Bacillus subtilis,* etc.), yeast, filamentous fungi, insect cells, eukaryotic cells, and animal cells (mammalian cells including human cells, etc.).

When a prokaryotic cell is used as a host cell, examples of the host cell include bacteria belonging to the genus *Escherichia* such as *Escherichia coli,* the genus *Bacillus* such as *Bacillus subtilis,* the genus *Pseudomonas* such as *Pseudomonas putida,* and the genus *Rhizobium* such as *Rhizobium meliloti. Escherichia coli* that can be used for production of heterologous protein is well known to those skilled in the art, and there are many commercially available *E. coli* strains (for example, *Escherichia coli* BL21T1R, *Escherichia coli* BL21, *E. coli* XL1-Blue, *E. coli* XL2-Blue, *E. coli* DH1, *E. coli* JM109, *E. coli* HB101, etc.). Further, *Bacillus subtilis* MI114, *B. subtilis* 207-21 and the like belonging to the genus *Bacillus, Brevibacillus choshinensis* and the like belonging to the genus *Brevibacillus* are known as hosts for production of heterologous proteins. The above-mentioned host cells and suitable expression vectors can be used in combination for production of the mismatch endonuclease mutant of the present invention. Preferably, *E. coli* BL21T1R or BL21DE3, which is strain BL21 of *E. coli,* can be used.

A method for introducing the expression vector into the host is not particularly limited as long as it can introduce a nucleic acid into the host. Examples of the method include a method using calcium ions, an electroporation method, a spheroplast method, and a lithium acetate method. A method for introducing the expression vector into insect cells is not particularly limited as long as it can introduce a DNA into insect cells, and examples thereof include a calcium phosphate method, a lipofection method, and an electroporation method. When a phage vector or a viral vector is used, host cells can be infected by a suitable method for the vector and thereby a transformant expressing the mismatch endonuclease mutant of the present invention can be obtained.

The transformant is cultured. The mismatch endonuclease mutant of the present invention can be collected from the culture of the transformant. The culture conditions are not particularly limited as long as they are suitable for the expression vector used, the host used and the like. For example, *Escherichia coli* BL21DE3 is transformed with a pET vector, and the transformant is inoculated into an LB medium and cultured with shaking at 37° C. When an OD value of the culture reaches 0.2 to 0.8, IPTG is added to the medium, and then, shaking culture is continued to induce the expression of a desired protein, for example, at 15 to 30° C. for 2 to 5 hours, preferably 25° C. for 4 to 5 hours. Then, the culture is centrifuged, and bacterial cells thus obtained are washed, and then subjected to ultrasonication or lysis with lysozyme to obtain a total cell extract containing the mutant of the present invention. Since the extract contains a large amount of impurities, the mutant of the present invention is preferably purified by appropriately combining purification methods used in the art, for example, ammonium sulfate precipitation, anion exchange column, cation exchange column, gel filtration column, affinity chromatograph column, dialysis, and the like. The mutant with an affinity tag can be easily purified by using an affinity carrier appropriate for the property of the affinity tag. Further, in addition to IPTG, other necessary inducers such as L-arabinose may be added at an appropriate timing, depending on the type of host or expression vector used.

5. Method for Producing Nucleic Acid Encoding Mismatch Endonuclease Mutant of the Present Invention The method for producing a nucleic acid of the present invention comprises a step of, for example, replacing a codon encoding serine at a position corresponding to position 47 in the amino acid sequence of SEQ ID NO: 1 by a codon encoding a basic amino acid, in a nucleic acid encoding a mismatch endonuclease that is polypeptide PF_RS00065 or a mutant polypeptide thereof W77F, or a homologue of RS_00065. The codon for serine is preferably replaced by a codon for arginine or lysine, more preferably by a codon for arginine. Similarly, codons for the amino acid residues at the other positions can be also replaced.

As described above in section 1, the mismatch endonuclease mutant of the present invention may comprise a mutation at another amino acid position. Even in that case, the codon can be replaced similarly.

Preferred examples of the nucleic acid encoding the mismatch endonuclease mutant comprising the codon replacement as described above include nucleic acids of SEQ ID NOs: 16 to 30.

The codon replacement may be performed by a known method, including, but not limited to, introduction of mutation by a known method such as site-specific mutagenesis using a primer for introduction of mutation, and artificial synthesis of a nucleic acid having a mutated sequence (or a part of the sequence). Further, codon optimization may be performed for the purpose of allowing the expression in the host used or increasing the expression level. The codon optimization can be performed by a method commonly used in the art.

The method for producing a nucleic acid of the present invention may further comprise replacing a codon for the purpose of stabilization and increase of protein production in the host, in the nucleic acid encoding the mismatch endonuclease mutant.

For the method for producing a nucleic acid of the present invention, the nucleic acid as explained above in section 2 can be applied.

6. Method for Cleaving Double-Stranded Nucleic Acid of the Present Invention The method for cleaving a double-stranded nucleic acid of the present invention is performed by treating a double-stranded nucleic acid having a mismatch with the mismatch endonuclease mutant of the present invention as described above in section 1, in an appropriate buffer containing a divalent metal ion (for example, magnesium ion). According to the method of the present invention, a double-stranded nucleic acid containing a G-G mismatch, a T-T mismatch, a G-T mismatch or a T-G mismatch can be cleaved.

For the method for cleaving a double-stranded nucleic acid of the present invention, the double-stranded nucleic acid having a mismatch may be a double-stranded nucleic acid containing a mismatch inside (between two base pairs that are normally pairing). The double-stranded nucleic acid having a mismatch may be not only a double-stranded nucleic acid containing one mismatch, but also a double-stranded nucleic acid containing two or more mismatches at intervals or a double-stranded nucleic acid containing two or more consecutive mismatches. Examples of the mismatch for the method for cleaving a double-stranded nucleic acid of the present invention include preferably 1 to 8 consecutive mismatches, more preferably 1 to 4 consecutive mismatches, further preferably two consecutive mismatches, and one mismatch, which exist in the double-stranded nucleic acid. In the method for cleaving a double-stranded nucleic acid of the present invention, when two or more mismatches are present in the double-stranded nucleic acid, the two or more mismatches may be the same type of mismatches or may be different types of mismatches.

Further, an oligodeoxynucleotide as disclosed in WO2014/142261 and the like may be used. As used herein, the oligodeoxynucleotide is an oligodeoxynucleotide designed to generate one or several mismatches when hybridized with a nucleic acid having a specific nucleotide sequence (for example, having a genetic mutation of interest). For use as a probe for mutation detection, the oligodeoxynucleotide can be labeled with a fluorescent substance and a quenching substance at both ends. The length of the oligodeoxynucleotide can be appropriately determined so that the oligodeoxynucleotide can be hybridized with the nucleic acid having a specific nucleotide sequence under reaction conditions to be carried out. When the oligodeoxynucleotide is hybridized with the nucleic acid having a specific nucleotide sequence, a mismatch is preferably generated at a position at least 3 nucleotides away from both the 5' end and 3' end of the oligodeoxynucleotide.

Further, when the genetic mutation cannot be analyzed because the genetic mutation to be detected does not match the substrate specificity of the mismatch endonuclease, a suppressive oligonucleotide as disclosed in WO2016/152812 and the like may be used. As used herein, the suppressive oligonucleotide is an oligonucleotide that forms at least one mismatch when the oligonucleotide is hybridized with a non-target nucleic acid, and forms more mismatches when the oligonucleotide is hybridized with a target nucleic acid than when the oligonucleotide is hybridized with the non-target nucleic acid. The number of the at least one mismatch formed when the suppressive oligonucleotide is hybridized with a non-target nucleic acid is not particularly limited as long as selective cleavage of the non-target nucleic acid occurs, and examples thereof include 1 to 7, 1 to 5, or 1 to 3 mismatches depending on the length of the suppressive oligonucleotide. When the number of the at least one mismatch is expressed as a percentage of the length of the suppressive oligonucleotide, for example, the at least one mismatch accounts for 1-20%, 3-15%, or 4-8% of the length of the suppressive oligonucleotide. As an example of this aspect, a combination of the target nucleic acid and the non-target nucleic acid which differ by only one base in their nucleotide sequences is explained. When the suppressive oligonucleotide is hybridized with the target nucleic acid, a mismatch is formed between the suppressive oligonucleotide and the base that differs between the target nucleic acid and the non-target nucleic acid (hereinafter, sometimes, referred to as a first mismatch), while another mismatch is formed (hereinafter, sometimes, referred to as a second mismatch).

The base pair of the first mismatch relates to the base differing between the target nucleic acid and the non-target nucleic acid, regardless of whether the mismatched base pair is recognized and cleaved by the co-existing polypeptide having a mismatch endonuclease activity.

The second mismatch is a mismatched base pair that is recognized and cleaved by the co-existing polypeptide having a mismatch endonuclease activity. For example, when a polypeptide having a mismatch endonuclease activity to recognize and cleave guanine base-guanine base, guanine base-thymine base, or thymine base-thymine base is used, the suppressive oligonucleotide is designed to form a mismatch selected from the above-mentioned mismatched base pairs.

When the suppressive oligonucleotide is hybridized with the non-target nucleic acid, the second mismatch is formed while the first mismatch is not formed.

Designing and using the suppressive oligonucleotide having the above-mentioned properties enable selective cleavage of a non-target nucleic acid by a polypeptide having a mismatch endonuclease activity. The present invention is not limited to use of the suppressive oligonucleotide capable of forming one or two mismatches as mentioned above. As long as selective cleavage of the desired nucleic acid occurs, a suppressive oligonucleotide capable of forming 3 or more mismatches may be designed and used. In such a case, at least one mismatch formed in a target nucleic acid and a non-target nucleic acid may be the second mismatch, and the other mismatches may or may not be recognized and cleaved by a polypeptide having a mismatch endonuclease activity. The 3 or more mismatches are preferably recognized and cleaved by a polypeptide having a mismatch endonuclease activity.

The oligodeoxynucleotide as disclosed in WO2014/142261 etc. and the suppressive oligonucleotide as disclosed in WO2016/152812 etc. are composed of DNA, or may partially comprise nucleotide analogs or RNA. In other words, the oligodeoxynucleotide and the suppressive oligonucleotide are not particularly limited as long as they have a structure that forms a double-stranded nucleic acid having at least one mismatch when hybridized with a non-target nucleic acid, and the mismatch is recognized and cleaved by a co-existing polypeptide having a mismatch endonuclease activity.

Examples of a double-stranded nucleic acid having the mismatch cleaved by the method of the present invention include a PCR product, a nucleic acid derived from a biological sample such as a genomic DNA or a fragment thereof, and a synthetic nucleic acid. The double-stranded nucleic acid having the mismatch may be a mixture of nucleic acids from biological samples, or a melting-reannealing mixture of a nucleic acid from a biological sample and a synthetic nucleic acid. For example, when a nucleic acid comprising a mutation and a wild-type nucleic acid are mixed, melted and reannealed, a mismatch is formed and cleavage by a mismatch endonuclease occurs at a position of the mismatch. The size of a nucleic acid fragment thus obtained after cleavage by mismatch endonuclease can be observed to estimate the presence or absence and the position of a mutation. Use of the mismatch endonuclease of the present invention allows mutation analysis by simply adding this mismatch endonuclease to a reaction solution for nucleic acid amplification such as PCR. For PCR, it is known that an increase of amplification effect is not found when the number of cycles is increased to above a certain number. This is mainly because of depletion of added primers or substrate dNTPs or competition between the primers and reaction products for annealing. At this time, annealing between reaction products occurs. If both a template having a mutation and a wild-type template are present, a mismatch is formed at the mutated position by annealing between a reaction product amplified from the mutated template and a reaction product amplified from the wild-type template. Therefore, mutation analysis becomes possible by simply performing PCR in the presence of the mismatch endonuclease of the present invention for a larger number of cycles than usual. In other words, the present invention provides a method for analyzing a mutation, the method comprising treating a double-stranded nucleic acid with the mismatch endonuclease described above in section 1.

The method for cleaving a double-stranded nucleic acid of the present invention can be performed in the presence of an acidic high molecular substance. The acidic high molecular substance has been found to have effect of controlling the mismatch recognition and cleavage activity of the polypeptide by coexistence of the acidic high molecular substance. The acidic high molecular substance exerts more effect in a sample containing a small amount of nucleic acid. Preferable examples of the acidic high molecular substance include polyanions. Preferable examples of the acidic high molecular substance also include acidic polysaccharides having a sugar backbone and acidic polysaccharides having a liner carbon chain. As the acidic high molecular substance, one or more substances selected from the group consisting of fucose sulfate-containing polysaccharide, dextran sulfate, carrageenan, heparin, rhamnan sulfate, dermatan sulfate (chondroitin sulfate B), heparan sulfate, hyaluronic acid, alginic acid, pectin, polyglutamic acid, polyacrylic acid, polyvinyl sulfate, polystyrene sulfate, and their salts, and different nucleic acids from a target nucleic acid and a non-target nucleic acid can be used.

The method for cleaving a double-stranded nucleic acid of the present invention may be performed further in combination with use of a proliferating cell nuclear antigen (PCNA).

7. Amplification Method of Double-Stranded Nucleic Acid of the Present Invention The method for cleaving a double-stranded nucleic acid of the present invention can be performed even in a process of nucleic acid amplification reaction. A double-stranded nucleic acid having a mismatch formed by incorporation of an incorrect nucleotide during the amplification process is cleaved by adding a mismatch endonuclease to a reaction mixture for nucleic acid amplification. As a result, amplification of a nucleic acid having a different sequence from that of a template nucleic acid before the start of reaction is suppressed. Thus, nucleic acid amplification with a reduced error rate becomes possible.

That is, the present invention provides a nucleic acid amplification method comprising a step of cleaving a double-stranded nucleic acid having a mismatch by using the mismatch endonuclease mutant of the present invention as described above in section 1. The step of cleaving a double-stranded nucleic acid having a mismatch may be performed simultaneously with a step of nucleic acid amplification. Further, as an aspect of the present invention, a composition comprising (a) a DNA polymerase, (b) at least one pair of oligonucleotide primers, and (c) the mismatch endonuclease described above in section 1 is provided.

Similarly, as an aspect of the present invention, a nucleic acid amplification method comprising a step of preparing a composition comprising the above-described composition for nucleic acid amplification reaction and a nucleic acid molecule as a template, and a step of performing nucleic acid amplification by reacting the obtained composition under appropriate conditions is also provided.

The above-described composition may further comprise at least one selected from the group consisting of a reaction buffer, a divalent metal ion, a deoxyribonucleotide, an oligonucleotide probe, and an intercalating dye. When the composition is used for nucleic acid amplification reaction, the composition may further comprise a nucleic acid as a template for the nucleic acid amplification reaction. In the composition, the deoxyribonucleotide may contain a nucleotide analog. The reaction buffer means a compound or a mixture having an ability to mitigate change of hydrogen ion concentration (pH) in a reaction solution. Since a mixed solution of a weak acid and its salt, or a weak base and its salt generally has a strong buffering function, the mixed solution is widely used as a reaction buffer for the purpose of pH control. Examples of the reaction buffer used in the present invention include Good's buffers such as Tris-HCl, and HEPES-KOH, and phosphate buffers such as a sodium phosphate buffer. Examples of the divalent metal ion include a magnesium ion, a manganese ion, a zinc ion, and a cobalt ion. The divalent metal ion may be provided as a salt form such as a chloride, a sulfate, or an acetate.

An example of the method for amplifying a double-stranded nucleic acid of the present invention is a method for amplifying DNA, which the present invention is not particularly limited to. Examples of the method for amplifying DNA include polymerase chain reaction (PCR), MDA (multiple displacement amplification), and isothermal nucleic acid amplification such as ICAN and LAMP.

The concentration of a polypeptide having a mismatch endonuclease activity in the above-described composition for nucleic acid amplification reaction may be determined by determining a concentration that does not inhibit a DNA amplification reaction or a concentration effective for cleavage of a double-stranded nucleic acid having a mismatch in each reaction system as appropriate.

As at least one pair of primers used for the above-described composition for nucleic acid amplification reaction, two or more primers suitable for each nucleic acid amplification method are selected. The primers may be DNA primers, RNA primers, or chimeric primers in which a part of a DNA molecule is replaced by RNA, as long as the desired amplification is attained. The primers may also be primers containing a known nucleic acid analog, and labeled primers, for example, with a fluorescent dye for the purpose of detection.

Further, as another aspect of the composition of the present invention, the composition may comprise a component for preventing carryover. Examples of such a component include dUTP, and uracil N-glycosidase.

The method for amplifying a double-stranded nucleic acid of the present invention can be performed in the presence of the above-described acidic high molecular substance. The acidic high molecular substance exerts more effect in a sample containing a small amount of nucleic acid. Preferable examples of the acidic high molecular substance are as described above for the method for selectively cleaving a non-target nucleic acid of the present invention. The method of the present invention may be performed further in combination with the above-described proliferating cell nuclear antigen (PCNA) or a mutant thereof.

8. Method for Suppressing Nucleic Acid Amplification of the Present Invention The method for suppressing nucleic acid amplification of the present invention comprises utilizing the mismatch endonuclease mutant of the present invention described above in section 1 and the appropriately designed oligodeoxynucleotide or suppressive oligonucleotide to suppress amplification of a nucleic acid having a specific nucleotide sequence in a nucleic acid amplification reaction.

Thus, an aspect of the present invention provides a method for suppressing amplification of a nucleic acid having a specific nucleotide sequence in a nucleic acid amplification reaction, the method comprising a step of performing the nucleic acid amplification reaction in the presence of (a) an oligodeoxynucleotide that is designed to produce one or several mismatches when hybridized with the nucleic acid having a specific nucleotide sequence or a suppressive oligonucleotide, (b) a DNA polymerase, (c) at least one pair of oligonucleotide primers, and (d) a polypeptide having a mismatch endonuclease activity. A further aspect of the present invention provides a method for preferentially amplifying a target nucleic acid, the method comprising suppressing amplification of a nucleic acid having a specific nucleotide sequence containing one or several different nucleotides from the nucleotide sequence of the target nucleic acid by using the above-described method.

The oligodeoxynucleotide or suppressive oligonucleotide of (a) is not particularly limited as long as it is a single-stranded DNA having a nucleotide sequence designed to form one or several mismatches when hybridized with a nucleic acid having a specific nucleotide sequence. The oligodeoxynucleotide or suppressive oligonucleotide may be a so-called chimeric oligodeoxynucleotide in which a part of a DNA molecule is replaced by RNA. The 3'-end of the oligodeoxynucleotide or suppressive oligonucleotide may be modified so as to inhibit an extension reaction from the single-stranded DNA by a DNA polymerase, to which the present invention is not particularly limited. Examples of the modification include amination. The oligodeoxynucleotide or suppressive oligonucleotide may be protected from cleavage with a deoxyribonuclease by phosphorothioation or other modifications, as long as the nucleic acid to which the oligodeoxynucleotide or suppressive oligonucleotide is bound undergoes cleavage with the polypeptide having a mismatch endonuclease activity. The oligodeoxynucleotide or suppressive oligonucleotide may be labeled with a fluorescent dye, a quencher or the like for the purpose of detection.

The length of the oligodeoxynucleotide or suppressive oligonucleotide can be appropriately determined so that the oligodeoxynucleotide or suppressive oligonucleotide can be hybridized with the nucleic acid having a specific nucleotide sequence under conditions of the reaction performed. The position of a mismatch generated when the oligodeoxynucleotide or suppressive oligonucleotide is hybridized with the nucleic acid having a specific nucleotide sequence is preferably at least 3 nucleotides away from both the 5' end and 3' end of the oligodeoxynucleotide or suppressive oligonucleotide.

For example, when the method of the present invention is performed for suppressing amplification of a nucleic acid having a specific nucleotide sequence by a method including a reaction at high temperature such as PCR, a heat-resistant mismatch endonuclease is preferably used. The mismatch endonuclease described above in section 1 includes thermostable enzymes that are not inactivated in PCR, and such enzymes are suitable for the above use.

Therefore, the present invention further provides a composition for a nucleic acid amplification reaction, comprising the following (a) to (d):

(a) an oligodeoxynucleotide that is designed to produce one or several mismatches when hybridized with the nucleic acid comprising a specific nucleotide sequence or a suppressive oligonucleotide or a complementary strand thereof;
(b) a DNA polymerase;
(c) at least one pair of oligonucleotide primers; and
(d) the mismatch endonuclease mutant of the present invention described above in section 1.

The above-described composition may further comprise at least one selected from the group consisting of a reaction buffer, a divalent metal ion, a deoxyribonucleotide, an oligonucleotide probe, and an intercalating dye. The above-described composition may further comprise a nucleic acid as a template for nucleic acid amplification reaction. The above-described composition may further comprise dUTP or uracil N-glycosidase.

The method for suppressing amplification of a nucleic acid having a specific nucleotide sequence in a nucleic acid amplification reaction of the present invention can be performed by any nucleic acid amplification method. A preferred example of such a nucleic acid amplification method is, but not limited to, a method of amplifying DNA. Examples of the method of amplifying DNA include PCR, MDA, and isothermal nucleic acid amplification such as ICAN and LAMP.

The method for suppressing amplification of a nucleic acid having a specific nucleotide sequence in a nucleic acid amplification reaction of the present invention can be applied to any nucleic acid. When the method is applied to DNA amplification, such a DNA may be a DNA present in an artificially prepared DNA mixture, an environment-derived sample, a biological sample, or a DNA mixture prepared from the above-mentioned sample. Examples of the biological sample include, but are not limited to, samples derived from mammals such as human. Examples of the DNA mixture include, but not limited to, a mixture of fragments of a genomic DNA, a mixture of cDNAs produced from mRNA by a reverse transcription reaction, and a mixture of a plurality of PCR products. Examples of a DNA having a specific nucleotide sequence whose amplification is suppressed include a reverse transcription product from rRNA which remains unseparated, and a small molecule DNA produced by pairing of primers. In the case of amplifying a gene library which is followed by functional screening, a library capable of more efficiently searching for unknown genes can be produced by suppressing amplification of DNAs having sequences of positive known genes.

The concentration of the polypeptide having a mismatch endonuclease activity in the method of the present invention may be determined by determining a concentration that does not inhibit a DNA amplification reaction or a concentration effective for cleavage of a double-stranded nucleic acid having a mismatch in each reaction system as appropriate. The concentration of the oligonucleotide or the suppressive oligodeoxynucleotide may be determined by optimizing the concentration used in consideration of the amount of a template and the amplification efficiency of a target DNA. For example, the concentration of the oligodeoxynucleotide or the suppressive oligonucleotide can be 0.1 to 10 times the concentration of a primer used for amplification reaction.

As described above, the present invention provides a method for preferentially amplifying a target nucleic acid. The method may further comprise a step of detecting the amplified target DNA. Hereinafter, this aspect of the present invention may be referred to as "the method for detecting a nucleic acid of the present invention". For example, according to the detection method of the present invention in which a DNA is used as a target to be detected, even when a DNA that is not a target to be detected (a DNA having a specific nucleotide sequence) exists in an excessively large amount relative to a DNA that is a target to be detected (a target DNA), amplification of the non-target DNA as a template is suppressed by virtue of the oligonucleotide or suppressive oligonucleotide and the polypeptide having a mismatch endonuclease activity in the method for suppressing amplification of a nucleic acid having a specific nucleotide sequence in a nucleic acid amplification reaction of the present invention, and therefore the target DNA to be detected can be detected.

The method for suppressing amplification of a nucleic acid of the present invention can be performed in the presence of the above-described acidic high molecular substance. The acidic high molecular substance exerts more effect in a sample containing a small amount of nucleic acid. Preferable examples of the acidic high molecular substance are as described above for the method for selectively cleaving a non-target nucleic acid of the present invention. The method of the present invention may be performed further in combination with the above-described proliferating cell nuclear antigen (PCNA) or a mutant thereof.

9. Method for Detecting Nucleic Acid of the Present Invention

The method for detecting a nucleic acid of the present invention comprises a step of suppressing amplification of a non-target nucleic acid by the method for suppressing amplification of a nucleic acid of the present invention as described above in section 8 and thereby preferentially amplifying a target nucleic acid, and a step of detecting the amplified target nucleic acid. The method for detecting a nucleic acid of the present invention enables to distinctively detect a wild-type and a mutant-type, for example, of a nucleic acid corresponding to a gene wherein a mutation in the gene is known to be present. When the detection method of the present invention is performed using a DNA comprising a wild-type nucleotide sequence as the nucleic acid having a specific nucleotide sequence (non-target nucleic acid), a small number of a mutant allele can be detected in the presence of an excessively large amount of the normal allele (i.e., a DNA having the wild-type nucleotide sequence). For example, the method of the present invention is useful for detection of a circulating tumor DNA, or detection of a small amount of a fetal DNA sequence contained in the mother's blood. Examples of the mutation include microdeletion and point mutation. Polymorphisms generated by point mutation are called single nucleotide polymorphisms (SNPs). As used herein, a DNA having a mutant nucleotide sequence among SNPs is sometimes referred to as a DNA having a single nucleotide polymorphism mutation.

Preferred examples of the small number of the mutant allele include, but not limited to, nucleic acids containing at least one single nucleotide polymorphism selected from the group consisting of a single nucleotide polymorphism mutation used as a tumor marker, a single nucleotide polymorphism mutation correlating with a therapeutic effect of an agent for the treatment of cancer, and a single nucleotide polymorphism mutation known to correlate with canceration of cells. Examples of SNPs include those frequently found in tumor cells, and those known to correlate with a therapeutic effect of an agent for the treatment of cancer or carcinogenesis. Examples of such SNPs include SNPs of K-ras genes, B-raf genes, and epidermal growth factor receptor (EGFR) genes. Somatic mutations in the K-ras gene are frequently found in colorectal cancer, lung adenocarcinoma, thyroid cancer, and the like. Somatic mutations in the B-raf gene are frequently found in colorectal cancer, malignant melanoma, papillary thyroid cancer, non-small cell lung cancer, lung adenocarcinoma, and the like. Somatic mutations in the EGFR gene are frequently found in various solid tumors. It is known that the treatment of a cancer with an EGFR inhibitor such as gefitinib or erlotinib is likely to be effective when the EGFR gene in the cancer tissue has a specific single nucleotide polymorphism mutation. In contrast, it is known that a cancer is likely to be resistant to an EGFR inhibitor when the K-ras gene in the cancer tissue has a single nucleotide polymorphism mutation.

The detection method of the present invention may be performed using, as the material, a DNA obtained after treatment of a composition containing a methylated DNA extracted from a sample from an organism with bisulfite. According to the detection method of the present invention, detection of a small number of a methylated allele in the presence of an excessively large amount of a non-methylated allele, or detection of a small number of a non-methylated allele in the presence of an excessively large amount of a methylated allele can be performed.

As the treatment with bisulfite, a known bisulfite method, which is used for detection of a methylated DNA can be used. By the treatment, non-methylated cytosine is changed into uracil, whereas methylated cytosine is not changed. When a reaction solution treated with bisulfite is subjected to amplification by PCR, uracil is changed into thymine and methylated cytosine is changed into cytosine. In other words, detection of a small number of a methylated allele in the presence of an excessively large amount of a non-methylated allele at a specific site, and detection of a small number of a non-methylated allele in the presence of an excessively large amount of a methylated allele respectively correspond to examination of the presence of cytosine in the presence of an excessively large amount of thymine, and examination of the presence of thymine in the presence of an excessively large amount of cytosine. When amplification of an excessively large amount of DNA containing thymine or cytosine is suppressed, the presence of a small number of a methylated allele or non-methylated allele is easily examined.

For the step of detecting the target nucleic acid in the detection method of the present invention, electrophoresis, nucleotide sequence analysis, or real-time PCR using a probe such as a cycling probe or a TaqMan probe can be used. For these detection methods, conventional techniques can be directly used. In particular, use of a high resolution melting (HRM) analysis method allows amplification and detection of a DNA of interest by one step, and thus rapid and simple examination of the DNA of interest is attained.

The method fox detecting a nucleic acid of the present invention can be performed in the presence of the above-described acidic high molecular substance. The acidic high molecular substance exerts more effect in a sample containing a small amount of nucleic acid. Preferable examples of the acidic high molecular substance are as described above for the method for selectively cleaving a non-target nucleic acid of the present invention. The method of the present invention may be performed further in combination with the above-described proliferating cell nuclear antigen (PCNA) or a mutant thereof.

EXAMPLES

Hereinafter, the present invention will be specifically described with reference to Examples, which the scope of the present invention is not limited to.

Experimental Method 1

(1-1) Preparation of Mismatch Endonuclease Mutant

A nucleotide sequence of a gene encoding polypeptide PF_R00065 from *Pyrococcus furiosus* (RefSeq ID: WP_11011124.1, SEQ ID NO: 1) is shown in SEQ ID NO: 16. Based on the above-mentioned nucleotide sequence, a mutation was introduced into a specific position to prepare an artificial gene by a conventional method. The artificial gene thus obtained was introduced into plasmid pET6xHN-C (manufactured by Takara Bio USA) using In-Fusion (registered trademark) HD Cloning Kit (manufactured by Takara Bio USA). The plasmid thus obtained has a nucleotide sequence encoding a mismatch endonuclease mutant with a histidine tag added to the C-terminal side.

Next, *Escherichia coil* BL21 DE3 strain (manufactured by Takara Bio Inc.) was transformed with the plasmid, and cultured overnight at 37° C. on a 1.5% agarose LB plate containing 100 µg/ml of ampicillin. Three single colonies were selected from the plate, inoculated into an LB medium containing 100 µg/ml of ampicillin (hereinafter referred to as an LB-AP medium), and cultured overnight at 37° C. with shaking. Then, 300 µl of the culture was inoculated into 6 ml of the LB-AP medium and cultured overnight at 37° C. with shaking. When an OD600 value reached 0.6, IPTG was added at a final concentration of 1 mM to the culture, followed by further incubation at 25° C. for 4 hours to induce the expression of the target gene. Then, when the OD600 value reached 4, bacterial cells were collected.

The bacterial cells thus obtained were suspended in 400 µl of a solution containing 50 mM Tris-HCl (pH 7.5), 300 mM NaCl, 5% glycerol and 0.15% Triton X-100 (hereinafter referred to as Buffer S), and subjected to ultrasonication at 4° C. for 30 seconds using a sonicator (manufactured by Sonic & Materials) three times. Thus a suspension became transparent. After ultrasonication, the suspension was centrifuged at 11000×g at 4° C. for 10 minutes, and a supernatant was collected. A crude extract thus obtained was subjected to Ni resin purification.

The Ni resin purification was carried out as follows. Specifically, 50 µl of Ni-NTA agarose (manufactured by Qiagen) was placed in a 1.5 ml tube, washed twice with 250 µl of sterile distilled water, and then equilibrated twice with 250 µl of Buffer A (50 mM Tris-HCl pH 7.5, 300 mM NaCl, 5% glycerol, and 5 mM imidazole). The equilibrated Ni-NTA agarose was suspended in 400 µl of the crude extract and allowed to stand for 30 minutes. Then, a suspension was centrifuged at 12000 rpm at 4° C. for 10 minutes. After removing a supernatant, the Ni-NTA agarose was washed 3 times with 100 µl of Buffer A. Then, an adsorbate was eluted from the Ni-NTA agarose with 100 µl of Buffer B (50 mM Tris-HCl pH 7.5, 300 mM NaCl, 5% glycerol and 300 mM imidazole). The eluate thus obtained was used in experiments as below as a mismatch endonuclease mutant solution.

(1-2) Preparation of Heterodimer-Type Mismatch Endonuclease Mutant

A gene encoding a heterodimer-type mismatch endonuclease mutant was prepared based on the gene encoding the mutant prepared in (1-1). An artificial gene was prepared by serially connecting a gene encoding a GG-specific mismatch endonuclease mutant and a gene encoding a TT-specific mismatch endonuclease mutant via a linker (SEQ ID NO: 35) in the same manner as in (1-1).

(2) Substrate Specificity Evaluation of Mismatch Endonuclease Mutant (2-1) Nucleic Acid NucS-Template-T (SEQ ID NO: 31), NucS-Template-G (SEQ ID NO: 32), NucS-Probe-T (SEQ ID NO: 33), and NucS-Probe-G (SEQ ID NO: 34) as nucleic acids forming substrate double-stranded DNAs were chemically synthesized by a known method. Double-stranded DNAs composed of combinations of the Templates and Probes were used as a substrate. FAM and Eclipse (registered trademark) Dark Quencher were added respectively to the 5' end and the 3' end of the two Probes.

(2-2) Cleavage Specificity

Total 25 µl of a mixture was prepared by mixing 2.5 µl of 10× buffer, 1 µl of 25 µM Template, 1.5 µl of 5 µM Probe, 5 µl of the mismatch endonuclease mutant solution, and 15 µl of sterile water. Using a thermal cycler, one cycle of 55° C. for 60 seconds was repeated for 60 cycles. Alternatively, using a thermal cycler, one cycle of 55° C. for 15 seconds was repeated for 60 cycles. The composition of the 10× buffer is 500 mM Tris-HCl (pH 9.2), 140 mM $(NH_4)_2SO_4$, 100 mM KCl, 25 mM $MgCl_2$, and 0.1% BSA. The composition of a buffer for dilution of enzyme is 25 mM Tris-HCl (pH 8.0), 50 mM KCl, 0.1 mM DTT, 0.01% Gelatin, 0.5 Nonidet P-40, 0.5% Tween-20, And 0.09% BSA.

Example 1

Preparation of Mismatch Endonuclease Mutant (1) Mismatch Endonuclease Mutant S47K+N76D According to Experimental Method 1 (1-1), an artificial gene encoding a mutant protein in which serine at position 47 and asparagine at position 76 in polypeptide PF_RS00065 from *Pyrococcus furiosus* were replaced by lysine and aspartic acid respectively was produced to prepare a mismatch endonuclease mutant solution. An amino acid sequence and a nucleic acid sequence of the mutant protein are shown in SEQ ID NO: 6 and SEQ ID NO: 21, respectively.

(2) Mismatch Endonuclease Mutant S47R+N76D+L123A

According to Experimental Method 1 (1-1), an artificial gene encoding a mutant protein in which serine at position 47, asparagine at position 76, and leucine at position 123 in polypeptide PF_RS00065 from *Pyrococcus furiosus* were replaced by lysine, aspartic acid, and alanine respectively was produced to prepare a mismatch endonuclease mutant solution. An amino acid sequence and a nucleic acid sequence of the mutant protein are shown in SEQ ID NO: 7 and SEQ ID NO: 22, respectively.

(3) Mismatch Endonuclease Mutant S47R+N76D+L123G

According to Experimental Method 1 (1-1), an artificial gene encoding a mutant protein in which serine at position 47, asparagine at position 76, and leucine at position 123 in polypeptide PF_RS00065 from *Pyrococcus furiosus* were replaced by lysine, aspartic acid, and glycine respectively was produced to prepare a mismatch endonuclease mutant solution. An amino acid sequence and a nucleic acid sequence of the mutant protein are shown in SEQ ID NO: 8 and SEQ ID NO: 23, respectively.

(4) Mismatch Endonuclease Mutant Q78R+L123S

According to Experimental Method 1 (1-1), an artificial gene encoding a mutant protein in which glutamine at position 78 and leucine at position 123 in polypeptide PF_RS00065 from *Pyrococcus furiosus* were replaced by arginine and serine respectively was produced to prepare a mismatch endonuclease mutant solution. An amino acid sequence and a nucleic acid sequence of the mutant protein are shown in SEQ ID NO: 9 and SEQ ID NO: 24, respectively.

(5) Mismatch Endonuclease Mutant Q78R+L123T

According to Experimental Method 1 (1-1), an artificial gene encoding a mutant protein in which glutamine at position 78 and leucine at position 123 in polypeptide PF_RS00065 from *Pyrococcus furiosus* were replaced by arginine and threonine respectively was produced to prepare a mismatch endonuclease mutant solution. An amino acid sequence and a nucleic acid sequence of the mutant protein are shown in SEQ ID NO: 10 and SEQ ID NO: 25, respectively.

(6) Mismatch Endonuclease Mutant Q78R+L123M

According to Experimental Method 1 (1-1), an artificial gene encoding a mutant protein in which glutamine at position 78 and leucine at position 123 in polypeptide PF_RS00065 from *Pyrococcus furiosus* were replaced by arginine and methionine respectively was produced to prepare a mismatch endonuclease mutant. solution. An amino acid sequence and a nucleic acid sequence of the mutant protein are shown in SEQ ID NO: 11 and SEQ ID NO: 26, respectively.

(7) Mismatch Endonuclease Mutant Q78R+L123C

According to Experimental Method 1 (1-1), an artificial gene encoding a mutant protein in which glutamine at position 78 and leucine at position 123 in polypeptide PF_RS00065 from *Pyrococcus furiosus* were replaced by arginine and cysteine respectively was produced to prepare a mismatch endonuclease mutant solution. An amino acid sequence and a nucleic acid sequence of the mutant protein are shown in SEQ ID NO: 12 and SEQ ID NO: 27, respectively.

(8) Mismatch Endonuclease Mutant Q78R+L125V

According to Experimental Method 1 (1-1), an artificial gene encoding a mutant protein in which glutamine at position 78 and leucine at position 125 in polypeptide PF_RS00065 from *Pyrococcus furiosus* were replaced by arginine and valine respectively was produced to prepare a mismatch endonuclease mutant solution. An amino acid sequence and a nucleic acid sequence of the mutant protein are shown in SEQ ID NO: 13 and SEQ ID NO: 28, respectively.

(9) Mismatch Endonuclease Mutant Q78R+L125A

According to Experimental Method 1 (1-1), an artificial gene encoding a mutant protein in which glutamine at position 78 and leucine at position 125 in polypeptide PF_RS00065 from *Pyrococcus furiosus* were replaced by arginine and alanine respectively was produced to prepare a mismatch endonuclease mutant solution. An amino acid sequence and a nucleic acid sequence of the mutant protein are shown in SEQ ID NO: 14 and SEQ ID NO: 29, respectively.

(10) Heterodimer-Type Mismatch Endonuclease Mutant

According to Experimental Method 1 (1-2), an artificial gene capable of expressing mutant 1 (S47R+N76D+L123A; SEQ ID NO: 7) and mutant 2 (Q78R+L123M; SEQ ID NO: 11) as single polypeptide via the linker (SEQ ID NO: 35) was produced to prepare a mismatch endonuclease mutant solution. An amino acid sequence and a nucleic acid sequence of the mutant protein are shown in SEQ ID NO: 15 and SEQ ID NO: 30, respectively.

Example 2

Substrate Specificity Evaluation of Mismatch Endonuclease Mutant

Using the mismatch endonuclease mutants prepared in Examples 1 (1) to (9), and the wild-type mismatch endonuclease (PfuNucS) and a mutant thereof W77F, substrate specificity evaluation was performed according to Experimental Method 1 (2). Results are shown in Table 2.

TABLE 2

| Mutant names | Substrate specificity | GG-specific/ TT-specific |
|---|---|---|
| No mutation (Wild-type) | TT, GG, TG | — |
| W77F | GG ≥ TG >> TT | — |
| S47K + N76D | GG | GG-specific |
| S47R + N76D + L123A | GG | GG-specific |
| S47R + N76D + L123G | GG | GG-specific |
| Q78R + L123S | TT | TT-specific |
| Q78R + L123T | TT | TT-specific |
| Q78R + L123M | TT | TT-specific |
| Q78R + L123C | TT | TT-specific |
| Q78R + L125V | TT | TT-specific |
| Q78R + L125A | TT | TT-specific |

As shown in Table 2, GG-specific mismatch endonuclease mutants and TT-specific mismatch endonuclease mutants having substrate specificity altered from that of the wild-type mismatch endonucleases were obtained.

Example 3

Substrate Specificity Evaluation of Heterodimer-Type Mismatch Endonuclease Mutant Using the heterodimer-type mismatch endonuclease mutant prepared in Example 1 (10), substrate specificity evaluation was performed according to Experimental Method 1 (2).

As a result, the heterodimer-type mismatch endonuclease mutant showed GT/TG mismatch-specific substrate specificity that was altered from that of the wild-type mismatch endonuclease and different from those of the mismatch endonuclease mutants prepared in Examples 1 (1) to (9).

INDUSTRIAL APPLICABILITY

The present invention is useful in broad fields including the fields of genetic technology, biology, medicine, and agriculture.

Sequence Listing Free Text
- SEQ ID NO: 1: Amino acid sequence of mismatch endonuclease PF0012 from *Pyrococcus furiosus*
- SEQ ID NO: 2; Amino acid sequence of mismatch endonuclease PF0012 W77F variant
- SEQ ID NO: 3: Amino acid sequence of mismatch endonuclease TERMP_01877 from *Thermococcus barophilus*
- SEQ ID NO: 4: Amino acid sequence of mismatch endonuclease MJ_0225 from *Methanocaldococcus jannaschii*
- SEQ ID NO: 5: Amino acid sequence of mismatch endonuclease TKO NucS from *Thermococcus kodakarensis*
- SEQ ID NO: 6: Amino acid sequence of mismatch endonuclease variant S47K+N76D from PF0012
- SEQ ID NO: 7: Amino acid sequence of mismatch endonuclease variant S47R+N76D+L123A from PF0012
- SEQ ID NO: 8: Amino acid sequence of mismatch endonuclease variant S47R+N76D+L123G from PF0012
- SEQ ID NO: 9: Amino acid sequence of mismatch endonuclease variant Q78R+L123S from PF0012
- SEQ ID NO: 10: Amino acid sequence of mismatch endonuclease variant Q78R+L123T from PF0012
- SEQ ID NO: 11: Amino acid sequence of mismatch endonuclease variant Q78R+L123M from PF0012
- SEQ ID NO: 12: Amino acid sequence of mismatch endonuclease variant Q78R+L123C from PF0012
- SEQ ID NO: 13: Amino acid sequence of mismatch endonuclease variant Q78R+L125V from PF0012
- SEQ ID NO: 14: Amino acid sequence of mismatch endonuclease variant Q78R+L125A from PF0012
- SEQ ID NO: 15: Amino acid sequence of mismatch endonuclease variant hetero dimer from variant S47R+N76D+L123A and variant Q78R+L123M
- SEQ ID NO: 16: Nucleic acid sequence encoding gene of mismatch endonuclease PF0012 from *Pyrococcus furiosus*
- SEQ ID NO: 17: Nucleic acid sequence encoding gene of mismatch endonuclease PF0012 W77F variant
- SEQ ID NO: 18: Nucleic acid sequence encoding gene of mismatch endonuclease TERMP_01877 from *Thermococcus barophilus*
- SEQ ID NO: 19: Nucleic acid sequence encoding gene of mismatch endonuclease MJ_0225 from *Methanocaldococcus jannaschii*
- SEQ ID NO: 20: Nucleic acid sequence encoding gene of mismatch endonuclease TKO NucS from *Thermococcus kodakarensis*
- SEQ ID NO: 21: Nucleic acid sequence encoding gene of mismatch endonuclease variant S47K+N76D from PF0012
- SEQ ID NO: 22: Nucleic acid sequence encoding gene of mismatch endonuclease variant S47R+N76D+L123A from PF0012
- SEQ ID NO: 23: Nucleic acid sequence encoding gene of mismatch endonuclease variant S47R+N76D+L123G from PF0012
- SEQ ID NO: 24: Nucleic acid sequence encoding gene of mismatch endonuclease variant Q78R+L123S from PF0012
- SEQ ID NO: 25: Nucleic acid sequence encoding gene of mismatch endonuclease variant Q78R+L123T from PF0012
- SEQ ID NO: 26: Nucleic acid sequence encoding gene of mismatch endonuclease variant Q78R+L123M from PF0012
- SEQ ID NO: 27: Nucleic acid sequence encoding gene of mismatch endonuclease variant Q78R+L123C from PF0012
- SEQ ID NO: 28: Nucleic acid sequence encoding gene of mismatch endonuclease variant Q78R+L125V from PF0012
- SEQ ID NO: 29: Nucleic acid sequence encoding gene of mismatch endonuclease variant Q78R+L125A from PF0012
- SEQ ID NO: 30: Nucleic acid sequence encoding gene of mismatch endonuclease variant hetero dimer from variant S47R+N76D+L123A and variant Q78R+L123M
- SEQ ID NO: 31: Synthetic oligo nucleotide "NucS-Template-T"
- SEQ ID NO: 32: Synthetic oligo nucleotide "NucS-Template-G"
- SEQ ID NO: 33: Synthetic oligo nucleotide "NucS-Probe-T". 5'-end is labeled with FAM and 3'-end is labeled with Eclipse.
- SEQ ID NO: 34: Synthetic oligo nucleotide "NucS-Probe-G". 5'-end is labeled with FAM and 3'-end is labeled with Eclipse.
- SEQ ID NO: 35: Amino acid sequence of Linker
- SEQ ID NO: 36: Nucleic acid sequence encoding Linker

SEQUENCE LISTING

```
<160> NUMBER OF SEQ ID NOS: 36

<210> SEQ ID NO 1
<211> LENGTH: 267
<212> TYPE: PRT
<213> ORGANISM: Pyrococcus furiosus
```

<400> SEQUENCE: 1

```
Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Ser Glu
                35                  40                  45

Leu Gly Glu Gly Asp Arg Ile Ile Ile Lys Pro Asp Gly Ser Phe
    50                  55                  60

Leu Ile His Gln Lys Lys Lys Arg Glu Pro Val Asn Trp Gln Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
                100                 105                 110

Val Leu Phe Met Ala Glu Asp Tyr Glu Glu Leu Thr Leu Thr Gly Ser
            115                 120                 125

Glu Ala Glu Met Ala Glu Leu Ile Phe Gln Asn Pro Asn Val Ile Glu
130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
            195                 200                 205

Leu Val Ala Pro Ser Leu Thr Glu Gly Ala Lys Lys Leu Leu Glu Lys
            210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265
```

<210> SEQ ID NO 2
<211> LENGTH: 267
<212> TYPE: PRT
<213> ORGANISM: Artificial Sequence
<220> FEATURE:
<223> OTHER INFORMATION: Amino acid sequence of mismatch endonuclease PF0012 W77F variant

<400> SEQUENCE: 2

```
Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Ser Glu
                35                  40                  45

Leu Gly Glu Gly Asp Arg Ile Ile Ile Lys Pro Asp Gly Ser Phe
    50                  55                  60

Leu Ile His Gln Lys Lys Lys Arg Glu Pro Val Asn Phe Gln Pro Pro
65                  70                  75                  80
```

```
Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Leu Thr Leu Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265

<210> SEQ ID NO 3
<211> LENGTH: 251
<212> TYPE: PRT
<213> ORGANISM: Thermococcus barophilus

<400> SEQUENCE: 3

Met Glu Ala Lys Val Glu Pro Ser His Glu Glu Ile Ile Glu Ile Leu
1               5                   10                  15

Asp Lys Ala Leu Ser Val Glu Ala Ile Ile Thr Leu Phe Ala Tyr Cys
            20                  25                  30

Arg Val Phe Tyr Glu Gly Arg Ala Lys Ser Glu Leu Gly Pro Gly Asp
        35                  40                  45

Arg Val Ile Ile Ile Lys Pro Asp Gly Ser Phe Leu Ile His Gln Lys
    50                  55                  60

Asn Lys Arg Glu Pro Val Asn Trp Gln Pro Pro Gly Ser Val Val Ser
65                  70                  75                  80

Ile Val Leu Glu Asp Gly Arg Ile Met Leu Arg Ser Val Arg Arg Lys
                85                  90                  95

Pro Lys Glu Thr Leu Glu Val Glu Leu Ile Lys Thr Tyr Leu Val Ser
            100                 105                 110

Tyr Phe Gln Ala Glu Asp Tyr Glu Glu Leu Thr Leu Thr Gly Ser Glu
        115                 120                 125

Ala Glu Met Ala Asp Leu Ile Phe Glu Asn Pro Ser Leu Ile Glu Glu
    130                 135                 140

Gly Phe Lys Pro Leu Phe Lys Glu Lys Pro Ile Lys His Gly Ile Val
145                 150                 155                 160

Asp Val Leu Gly Lys Asp Lys His Gly Asn Leu Val Val Leu Glu Leu
                165                 170                 175

Lys Arg Arg Arg Ala Asp Leu His Ala Val Ser Gln Leu Lys Arg Tyr
```

```
                180                 185                 190
Val Asp Ser Leu Arg Glu Glu His Lys Asn Val Arg Gly Ile Leu Val
            195                 200                 205

Ala Pro Ser Leu Thr Ala Gly Ala Lys Lys Leu Leu Glu Lys Glu Gly
    210                 215                 220

Leu Glu Phe Lys Lys Leu Asn Pro Pro Lys Arg Glu Lys Arg Lys Lys
225                 230                 235                 240

Gly Lys Gln Lys Thr Leu Asp Phe Leu Ser Pro
            245                 250

<210> SEQ ID NO 4
<211> LENGTH: 263
<212> TYPE: PRT
<213> ORGANISM: Methanocaldococcus jannaschii

<400> SEQUENCE: 4

Met Met Arg Leu Glu Lys Val Phe Tyr Leu Thr Asn Pro Thr Thr Lys
1               5                   10                  15

Asp Leu Glu Asn Phe Ile Asp Met Tyr Val Phe Lys Tyr Ile Leu Ile
            20                  25                  30

Leu Leu Ala Arg Cys Lys Val Phe Tyr Glu Gly Arg Ala Lys Ser Gln
        35                  40                  45

Leu Glu Glu Gly Asp Arg Val Ile Ile Lys Pro Asp Gly Ala Phe
    50                  55                  60

Leu Ile His Lys Asp Lys Lys Arg Glu Pro Val Asn Trp Gln Pro Ser
65                  70                  75                  80

Gly Ser Ser Ile Ile Trp Glu Val Glu Asp Asn Phe Phe Ile Leu Lys
                85                  90                  95

Ser Ile Arg Arg Lys Pro Lys Glu Glu Leu Lys Val Val Ile Ser Glu
            100                 105                 110

Val Tyr His Ala Cys Ala Phe Asn Cys Glu Asp Tyr Glu Glu Ile Asn
        115                 120                 125

Leu Arg Gly Ser Glu Ser Glu Met Ala Glu Met Ile Phe Arg Asn Pro
    130                 135                 140

Asp Leu Ile Glu Glu Gly Phe Lys Pro Ile Ser Arg Glu Tyr Gln Ile
145                 150                 155                 160

Pro Thr Gly Ile Val Asp Ile Leu Gly Lys Asp Lys Glu Asn Lys Trp
                165                 170                 175

Val Ile Leu Glu Leu Lys Arg Arg Ala Asp Leu Gln Ala Val Ser
            180                 185                 190

Gln Leu Lys Arg Tyr Val Glu Tyr Phe Lys Asn Lys Tyr Gly Glu Asp
        195                 200                 205

Lys Val Arg Gly Ile Leu Val Ser Pro Ser Leu Thr Thr Gly Ala Glu
    210                 215                 220

Lys Leu Leu Lys Glu Glu Asn Leu Glu Phe Lys Arg Leu Asn Pro Pro
225                 230                 235                 240

Lys Gly Ser Lys Arg Asp Leu Lys His Asn Ile Lys Thr Lys Lys Thr
                245                 250                 255

Thr Val Leu Asp Glu Trp Leu
            260

<210> SEQ ID NO 5
<211> LENGTH: 252
<212> TYPE: PRT
<213> ORGANISM: Thermococcus kodakarensis
```

<400> SEQUENCE: 5

```
Met Ser Lys Asp Lys Val Thr Val Ile Thr Ser Pro Ser Thr Glu Glu
1               5                   10                  15

Leu Val Ser Leu Val Asn Ser Ala Leu Leu Glu Glu Ala Met Leu Thr
            20                  25                  30

Ile Phe Ala Arg Cys Lys Val His Tyr Asp Gly Arg Ala Lys Ser Glu
        35                  40                  45

Leu Gly Ser Gly Asp Arg Val Ile Ile Val Lys Pro Asp Gly Ser Phe
    50                  55                  60

Leu Ile His Gln Ser Lys Lys Arg Glu Pro Val Asn Trp Gln Pro Pro
65                  70                  75                  80

Gly Ser Arg Val Arg Leu Glu Leu Arg Glu Asn Pro Val Leu Val Ser
                85                  90                  95

Ile Arg Arg Lys Pro Arg Glu Thr Leu Glu Val Glu Leu Glu Glu Val
            100                 105                 110

Tyr Met Val Ser Val Phe Arg Ala Glu Asp Tyr Glu Glu Leu Ala Leu
        115                 120                 125

Thr Gly Ser Glu Ala Glu Met Ala Glu Leu Ile Phe Glu Asn Pro Glu
    130                 135                 140

Val Ile Glu Pro Gly Phe Lys Pro Leu Phe Arg Glu Lys Ala Ile Gly
145                 150                 155                 160

Thr Gly Ile Val Asp Val Leu Gly Arg Asp Ser Asp Gly Asn Ile Val
                165                 170                 175

Val Leu Glu Leu Lys Arg Arg Ala Glu Leu His Ala Val Arg Gln
            180                 185                 190

Leu Lys Ser Tyr Val Glu Ile Leu Arg Glu Glu Tyr Gly Asp Lys Val
        195                 200                 205

Arg Gly Ile Leu Val Ala Pro Ser Leu Thr Ser Gly Ala Lys Arg Leu
    210                 215                 220

Leu Glu Lys Glu Gly Leu Glu Phe Arg Lys Leu Glu Pro Pro Lys Arg
225                 230                 235                 240

Asp Ser Lys Lys Lys Gly Arg Gln Lys Thr Leu Phe
                245                 250
```

<210> SEQ ID NO 6
<211> LENGTH: 267
<212> TYPE: PRT
<213> ORGANISM: Artificial Sequence
<220> FEATURE:
<223> OTHER INFORMATION: Amino acid sequence of mismatch endonuclease variant S47K+N76D from PF0012

<400> SEQUENCE: 6

```
Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Lys Glu
        35                  40                  45

Leu Gly Glu Gly Asp Arg Ile Ile Ile Lys Pro Asp Gly Ser Phe
    50                  55                  60

Leu Ile His Gln Lys Lys Lys Arg Glu Pro Val Asp Trp Gln Pro Pro
65                  70                  75                  80

Gly Ser Lys Val Lys Met Glu Gly Asn Ser Leu Ile Ser Ile Arg Arg
                85                  90                  95
```

```
Asn Pro Lys Glu Thr Leu Lys Val Asp Ile Ile Glu Ala Tyr Ala Ala
            100                 105                 110

Val Leu Phe Met Ala Glu Asp Tyr Glu Glu Leu Thr Leu Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265

<210> SEQ ID NO 7
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant S47R+N76D+L123A from PF0012

<400> SEQUENCE: 7

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Arg Glu
        35                  40                  45

Leu Gly Glu Gly Asp Arg Ile Ile Ile Lys Pro Asp Gly Ser Phe
    50                  55                  60

Leu Ile His Gln Lys Lys Lys Arg Glu Pro Val Asp Trp Gln Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Ala Thr Leu Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190
```

Tyr Val Asp Ala Leu Lys Glu Glu His Gly Asn Lys Val Arg Gly Ile
    195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
    260                 265

<210> SEQ ID NO 8
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant S47R+N76D+L123G from PF0012

<400> SEQUENCE: 8

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
                20                  25                  30

Ile Phe Ala Arg Cys Thr Val Tyr Tyr Glu Gly Arg Ala Lys Arg Glu
            35                  40                  45

Leu Gly Glu Gly Asp Arg Ile Ile Ile Lys Pro Asp Gly Ser Phe
    50                  55                  60

Leu Ile His Gln Lys Lys Lys Arg Glu Pro Val Asp Trp Gln Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
                100                 105                 110

Val Leu Phe Met Ala Glu Asp Tyr Glu Glu Gly Thr Leu Thr Gly Ser
            115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
    195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
    260                 265

<210> SEQ ID NO 9
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant Q78R+L123S from PF0012

<400> SEQUENCE: 9

```
Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
                20                  25                  30

Ile Phe Ala Arg Cys Thr Val Tyr Tyr Glu Gly Arg Ala Lys Ser Glu
            35                  40                  45

Leu Gly Glu Gly Asp Arg Ile Ile Ile Lys Pro Asp Gly Ser Phe
    50                  55                  60

Leu Ile His Gln Lys Lys Arg Glu Pro Val Asn Trp Arg Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Ser Thr Leu Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265
```

<210> SEQ ID NO 10
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant Q78R+L123T from PF0012

<400> SEQUENCE: 10

```
Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
                20                  25                  30

Ile Phe Ala Arg Cys Thr Val Tyr Tyr Glu Gly Arg Ala Lys Ser Glu
```

```
                35                  40                  45
Leu Gly Glu Gly Asp Arg Ile Ile Ile Lys Pro Asp Gly Ser Phe
 50                  55                  60
Leu Ile His Gln Lys Lys Lys Arg Glu Pro Val Asn Trp Arg Pro Pro
65                  70                  75                  80
Gly Ser Lys Val Lys Met Glu Gly Asn Ser Leu Ile Ser Ile Arg Arg
                85                  90                  95
Asn Pro Lys Glu Thr Leu Lys Val Asp Ile Ile Glu Ala Tyr Ala Ala
                100                 105                 110
Val Leu Phe Met Ala Glu Asp Tyr Glu Glu Thr Thr Leu Thr Gly Ser
                115                 120                 125
Glu Ala Glu Met Ala Glu Leu Ile Phe Gln Asn Pro Asn Val Ile Glu
                130                 135                 140
Glu Gly Phe Lys Pro Met Phe Arg Glu Lys Pro Ile Lys His Gly Ile
145                 150                 155                 160
Val Asp Val Leu Gly Val Asp Arg Glu Gly Asn Ile Val Val Leu Glu
                165                 170                 175
Leu Lys Arg Arg Arg Ala Asp Leu His Ala Val Ser Gln Leu Lys Arg
                180                 185                 190
Tyr Val Asp Ala Leu Lys Glu Glu His Gly Asn Lys Val Arg Gly Ile
                195                 200                 205
Leu Val Ala Pro Ser Leu Thr Glu Gly Ala Lys Lys Leu Leu Glu Lys
                210                 215                 220
Leu Gly Leu Glu Phe Arg Lys Leu Glu Pro Pro Lys Lys Gly Lys Lys
225                 230                 235                 240
Lys Ser Ser Lys Gln Lys Thr Leu Asp Phe Leu Asn Asp Thr Val Arg
                245                 250                 255
Ile Thr Gly Ala Ser Pro Pro Glu Ala Ile Gln
                260                 265

<210> SEQ ID NO 11
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant Q78R+L123M from PF0012

<400> SEQUENCE: 11

Met Glu Met Thr Lys Ala Ile Val Lys Glu Asn Pro Arg Ile Glu Glu
1               5                   10                  15
Ile Lys Glu Leu Leu Glu Val Ala Glu Ser Arg Glu Gly Leu Leu Thr
                20                  25                  30
Ile Phe Ala Arg Cys Thr Val Tyr Tyr Glu Gly Arg Ala Lys Ser Glu
                35                  40                  45
Leu Gly Glu Gly Asp Arg Ile Ile Ile Lys Pro Asp Gly Ser Phe
 50                  55                  60
Leu Ile His Gln Lys Lys Lys Arg Glu Pro Val Asn Trp Arg Pro Pro
65                  70                  75                  80
Gly Ser Lys Val Lys Met Glu Gly Asn Ser Leu Ile Ser Ile Arg Arg
                85                  90                  95
Asn Pro Lys Glu Thr Leu Lys Val Asp Ile Ile Glu Ala Tyr Ala Ala
                100                 105                 110
Val Leu Phe Met Ala Glu Asp Tyr Glu Glu Met Thr Leu Thr Gly Ser
                115                 120                 125
```

Glu Ala Glu Met Ala Glu Leu Ile Phe Gln Asn Pro Asn Val Ile Glu
            130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265

<210> SEQ ID NO 12
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant Q78R+L123C from PF0012

<400> SEQUENCE: 12

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Ser Glu
        35                  40                  45

Leu Gly Glu Gly Asp Arg Ile Ile Ile Lys Pro Asp Gly Ser Phe
50                  55                  60

Leu Ile His Gln Lys Lys Lys Arg Glu Pro Val Asn Trp Arg Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Cys Thr Leu Thr Gly Ser
        115                 120                 125

Glu Ala Glu Met Ala Glu Leu Ile Phe Gln Asn Pro Asn Val Ile Glu
            130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
210                 215                 220

```
Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
            245                 250                 255

Ile Thr Gly Ala Ser Pro Pro Glu Ala Ile Gln
        260                 265

<210> SEQ ID NO 13
<211> LENGTH: 267
<212> TYPE: PRT
<213> ORGANISM: Artificial Sequence
<220> FEATURE:
<223> OTHER INFORMATION: Amino acid sequence of mismatch endonuclease
      variant Q78R+L125V from PF0012

<400> SEQUENCE: 13

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Ser Glu
        35                  40                  45

Leu Gly Glu Gly Asp Arg Ile Ile Ile Lys Pro Asp Gly Ser Phe
50                  55                  60

Leu Ile His Gln Lys Lys Lys Arg Glu Pro Val Asn Trp Arg Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Leu Thr Val Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265

<210> SEQ ID NO 14
<211> LENGTH: 267
<212> TYPE: PRT
<213> ORGANISM: Artificial Sequence
<220> FEATURE:
<223> OTHER INFORMATION: Amino acid sequence of mismatch endonuclease
```

-continued variant Q78R+L125A from PF0012

<400> SEQUENCE: 14

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Ser Glu
        35                  40                  45

Leu Gly Glu Gly Asp Arg Ile Ile Ile Lys Pro Asp Gly Ser Phe
    50                  55                  60

Leu Ile His Gln Lys Lys Arg Glu Pro Val Asn Trp Arg Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Leu Thr Ala Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
    210                 215                 220

Leu Gly Leu Glu Phe Arg Lys Leu Glu Pro Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln
            260                 265

<210> SEQ ID NO 15
<211> LENGTH: 542
<212> TYPE: PRT
<213> ORGANISM: Artificial Sequence
<220> FEATURE:
<223> OTHER INFORMATION: Amino acid sequence of mismatch endonuclease
      variant hetero dimer from variant S47R+N76D+L123A and variant
      Q78R+L123M

<400> SEQUENCE: 15

Met Glu Met Thr Lys Ala Ile Val Lys Glu Asn Pro Arg Ile Glu Glu
1               5                   10                  15

Ile Lys Glu Leu Leu Glu Val Ala Glu Ser Arg Glu Gly Leu Leu Thr
            20                  25                  30

Ile Phe Ala Arg Cys Thr Val Tyr Tyr Glu Gly Arg Ala Lys Arg Glu
        35                  40                  45

Leu Gly Glu Gly Asp Arg Ile Ile Ile Lys Pro Asp Gly Ser Phe
    50                  55                  60

```
Leu Ile His Gln Lys Lys Arg Glu Pro Val Asp Trp Gln Pro Pro
65                  70                  75                  80

Gly Ser Lys Val Lys Met Glu Gly Asn Ser Leu Ile Ser Ile Arg Arg
                85                  90                  95

Asn Pro Lys Glu Thr Leu Lys Val Asp Ile Ile Glu Ala Tyr Ala Ala
            100                 105                 110

Val Leu Phe Met Ala Glu Asp Tyr Glu Glu Ala Thr Leu Thr Gly Ser
        115                 120                 125

Glu Ala Glu Met Ala Glu Leu Ile Phe Gln Asn Pro Asn Val Ile Glu
    130                 135                 140

Glu Gly Phe Lys Pro Met Phe Arg Glu Lys Pro Ile Lys His Gly Ile
145                 150                 155                 160

Val Asp Val Leu Gly Val Asp Arg Glu Gly Asn Ile Val Val Leu Glu
                165                 170                 175

Leu Lys Arg Arg Arg Ala Asp Leu His Ala Val Ser Gln Leu Lys Arg
            180                 185                 190

Tyr Val Asp Ala Leu Lys Glu Glu His Gly Asn Lys Val Arg Gly Ile
        195                 200                 205

Leu Val Ala Pro Ser Leu Thr Glu Gly Ala Lys Lys Leu Leu Glu Lys
210                 215                 220

Leu Gly Leu Glu Phe Arg Lys Leu Glu Pro Lys Lys Gly Lys Lys
225                 230                 235                 240

Lys Ser Ser Lys Gln Lys Thr Leu Asp Phe Leu Asn Asp Thr Val Arg
                245                 250                 255

Ile Thr Gly Ala Ser Pro Pro Glu Ala Ile Gln Leu Glu Val Leu Phe
            260                 265                 270

Gln Gly Pro Met Glu Met Thr Lys Ala Ile Val Lys Glu Asn Pro Arg
        275                 280                 285

Ile Glu Glu Ile Lys Glu Leu Leu Glu Val Ala Glu Ser Arg Glu Gly
    290                 295                 300

Leu Leu Thr Ile Phe Ala Arg Cys Thr Val Tyr Tyr Glu Gly Arg Ala
305                 310                 315                 320

Lys Ser Glu Leu Gly Glu Gly Asp Arg Ile Ile Ile Lys Pro Asp
                325                 330                 335

Gly Ser Phe Leu Ile His Gln Lys Lys Lys Arg Glu Pro Val Asn Trp
            340                 345                 350

Arg Pro Pro Gly Ser Lys Val Lys Met Glu Gly Asn Ser Leu Ile Ser
        355                 360                 365

Ile Arg Arg Asn Pro Lys Glu Thr Leu Lys Val Asp Ile Ile Glu Ala
370                 375                 380

Tyr Ala Ala Val Leu Phe Met Ala Glu Asp Tyr Glu Glu Met Thr Leu
385                 390                 395                 400

Thr Gly Ser Glu Ala Glu Met Ala Glu Leu Ile Phe Gln Asn Pro Asn
                405                 410                 415

Val Ile Glu Glu Gly Phe Lys Pro Met Phe Arg Glu Lys Pro Ile Lys
            420                 425                 430

His Gly Ile Val Asp Val Leu Gly Val Asp Arg Glu Gly Asn Ile Val
        435                 440                 445

Val Leu Glu Leu Lys Arg Arg Arg Ala Asp Leu His Ala Val Ser Gln
    450                 455                 460

Leu Lys Arg Tyr Val Asp Ala Leu Lys Glu Glu His Gly Asn Lys Val
465                 470                 475                 480

Arg Gly Ile Leu Val Ala Pro Ser Leu Thr Glu Gly Ala Lys Lys Leu
```

485                 490                 495
Leu Glu Lys Leu Gly Leu Glu Phe Arg Lys Leu Glu Pro Pro Lys Lys
            500                 505                 510

Gly Lys Lys Lys Ser Ser Lys Gln Lys Thr Leu Asp Phe Leu Asn Asp
            515                 520                 525

Thr Val Arg Ile Thr Gly Ala Ser Pro Pro Glu Ala Ile Gln
            530                 535                 540

<210> SEQ ID NO 16
<211> LENGTH: 804
<212> TYPE: DNA
<213> ORGANISM: Pyrococcus furiosus

<400> SEQUENCE: 16
atggaaatga ccaaagcgat tgtgaaagaa aacccgcgca ttgaagaaat taaagaactg      60
ctggaagtgg cggaaagccg cgaaggcctg ctgaccattt ttgcgcgctg caccgtgtat     120
tatgaaggcc gcgcgaaaag cgaactgggc gaaggcgatc gcattattat tattaaaccg     180
gatggcagct ttctgattca tcagaaaaag aaacgcgaac cggtgaactg gcagccgccg     240
ggcagcaaag tgaaaatgga aggcaacagc ctgattagca ttcgccgcaa cccgaaagaa     300
accctgaaag tggatattat tgaagcgtat gcggcggtgc tgtttatggc ggaagattat     360
gaagaactga ccctgaccgg cagcgaagcg gaaatggcgg aactgatttt tcagaacccg     420
aacgtgattg aagaaggctt taaaccgatg tttcgcgaaa accgattaa acatggcatt      480 gtggatgtgc tgggcgtgga tcgcgaaggc aacattgtgg tgctggaact gaaacgccgc     540
cgcgcggatc tgcatgcggt gagccagctg aaacgctatg tggatgcgct gaaagaagaa     600
catggcaaca agtgcgcgg cattctggtg gcgccgagcc tgaccgaagg cgcgaaaaaa     660
ctgctggaaa aactgggcct ggaatttcgc aaactggaac cgccgaaaaa aggcaaaaag     720
aaaagcagca acagaaaac cctggatttt ctgaacgata ccgtgcgcat taccggcgcg     780
agcccgccgg aagcgattca gtaa                                            804

<210> SEQ ID NO 17
<211> LENGTH: 804
<212> TYPE: DNA
<213> ORGANISM: Artificial Sequence
<220> FEATURE:
<223> OTHER INFORMATION: Nucleic acid sequence encoding gene of mismatch
      endonuclease PF0012 W77F variant

<400> SEQUENCE: 17
atggaaatga ccaaagcgat tgtgaaagaa aacccgcgca ttgaagaaat taaagaactg      60
ctggaagtgg cggaaagccg cgaaggcctg ctgaccattt ttgcgcgctg caccgtgtat     120
tatgaaggcc gcgcgaaaag cgaactgggc gaaggcgatc gcattattat tattaaaccg     180
gatggcagct ttctgattca tcagaaaaag aaacgcgaac cggtgaactt cagccgccg     240 ggcagcaaag tgaaaatgga aggcaacagc ctgattagca ttcgccgcaa cccgaaagaa     300
accctgaaag tggatattat tgaagcgtat gcggcggtgc tgtttatggc ggaagattat     360
gaagaactga ccctgaccgg cagcgaagcg gaaatggcgg aactgatttt tcagaacccg     420
aacgtgattg aagaaggctt taaaccgatg tttcgcgaaa accgattaa acatggcatt      480 gtggatgtgc tgggcgtgga tcgcgaaggc aacattgtgg tgctggaact gaaacgccgc     540
cgcgcggatc tgcatgcggt gagccagctg aaacgctatg tggatgcgct gaaagaagaa     600
catggcaaca agtgcgcgg cattctggtg gcgccgagcc tgaccgaagg cgcgaaaaaa     660

```
ctgctggaaa aactgggcct ggaatttcgc aaactggaac cgccgaaaaa aggcaaaaag    720
aaaagcagca aacagaaaac cctggatttt ctgaacgata ccgtgcgcat taccggcgcg    780
agcccgccgg aagcgattca gtaa                                          804
```

<210> SEQ ID NO 18
<211> LENGTH: 756
<212> TYPE: DNA
<213> ORGANISM: Thermococcus barophilus

<400> SEQUENCE: 18

```
atggaagcta aggttgaacc ctctcacgaa gaaataattg aaattttgga taaagccctc     60
tctgttgagg ctatcataac tcttttttgct tattgtaggg tattctatga ggggagagcc   120
aagagtgagc ttggccccgg ataggggtc attataatca agccagatgg ctcttttta    180 attcaccaga gaacaaaag agaacctgtt aactggcagc cgccggggag tgttgtcagc    240
atcgttcttg aggatgggag aataatgctg agaagtgtta ggagaaaacc gaagaaacc     300 cttgaagttg agctcattaa aacttatctt gtgagttatt ccaagcaga ggattatgag    360 gagctgacat taactggaag tgaagcagag atggctgatt tgatctttga aatccctca    420 ttaattgagg aaggatttaa accgctcttt aaggaaaagc caattaaaca tggaatagtt    480
gatgtgcttg aaaagacaa acatggcaat ttggttgtcc ttgagcttaa gcgcaggaga    540
gcagatctgc atgcggtcag tcaacttaaa agatatgttg attctctgag ggaggagcat    600
aaaaatgttc gtgggattt ggttgcccct tctcttacgg ctggggctaa aaaattactt    660 gaaaagaag ggctggaatt taaaaagctg aatccaccaa agcgtgaaaa gaggaaaaaa    720
ggcaagcaga aaacccttga ttttctcagc ccatag                             756
```

<210> SEQ ID NO 19
<211> LENGTH: 792
<212> TYPE: DNA
<213> ORGANISM: Methanocaldococcus jannaschii

<400> SEQUENCE: 19

```
atgatgagat tggagaaagt tttctatcta accaatccta ctaccaaaga tttagaaaat     60
tttattgata tgtatgtgtt taatatata ttaatattat tagctcgatg taaagttttt    120
tatgaaggca gagctaaaag tcagttagaa gagggagata gagtcattat aataaaacca    180
gatggagcct ttttaattca taaagataaa aaaagagaac ctgtaaattg caaccttct    240 ggaagtagta atatatggga agttgaagat aacttttca ttttaaaaag cattagaaga    300
aagccaaaag aagagttaaa ggttgttatt tcagaagttt atcatgcatg tgcttttaac    360
tgtgaagatt atgaagagat aaatctaagg ggtagtgaat cagagatggc agagatgatt    420
tttagaaatc cagatttgat tgaagaagga tttaagccca tatcaagaga gtatcagatt    480
cccactggaa tcgttgatat tttaggaaaa gataaagaga ataaatgggt tatcttagag    540
ctaaagagaa ggagagctga tttacaggca gtttctcaac taaaaaggta tgtggaatat    600
tttaaaaaca aatatggtga ggataaagtt agaggaattt ggttttctcc ctctttaact    660 actgggcgg aaaattgct gaaagaggag aacttagaat ttaaaagact taatccacca    720 aaggaagta aaagagattt aaaacataac ataaaaacta aaaaacaac agttttagat    780 gaatggctat aa                                                       792
```

<210> SEQ ID NO 20

```
<211> LENGTH: 759
<212> TYPE: DNA
<213> ORGANISM: Thermococcus kodakarensis

<400> SEQUENCE: 20
atgtccaagg ataaggtaac ggtcatcacg tcgccatcaa ccgaagaact cgtttcgcta    60
gtcaattcag ctctcttaga agaggccatg ctgacgattt ttgcccgctg taaggtccac   120
tacgatggaa gggcaaagag cgagctcggc tccggcgata gggtcatcat agtcaagccc   180
gacggctctt ttctcatcca ccagagcaag aagcgcgagc ccgtgaactg cagccaccg    240 ggtagcagag tgaggctgga gctgagggag aacccagttc tcgtctcgat aaggagaaag   300
ccgagggaga cccttgaggt cgagctcgaa gaggtctaca tggtctccgt cttccgagct   360
gaggactacg aggagctcgc ccttacgggg agcgaggccg agatggcgga gcttatcttt   420
gaaaatccag aggtcataga gcctggcttc aagccgctgt caggagaa ggcgatagga    480 actggaatcg ttgatgtcct tggaagggac agtgatggga atatagttgt ccttgagctt   540
aagcgcagga gggcggaact ccatgccgtt agacagctca agagctacgt cgagattctg   600
agagaggagt acggcgataa agtccgtgga attctcgttg ctccctcgct cacttctggg   660
gcaaaaagac tcctggaaaa ggagggcctc gagttcagga agctcgaacc gcctaaaaga   720
gactccaaaa agaagggcag acagaagaca ctgttttag               759

<210> SEQ ID NO 21
<211> LENGTH: 804
<212> TYPE: DNA
<213> ORGANISM: Artificial Sequence
<220> FEATURE:
<223> OTHER INFORMATION: Nucleic acid sequence encoding gene of mismatch
      endonuclease variant S47K+N76D from PF0012

<400> SEQUENCE: 21
atggaaatga ccaaagcgat tgtgaaagaa aacccgcgca ttgaagaaat taaagaactg    60
ctggaagtgg cggaaagccg cgaaggcctg ctgaccattt ttgcgcgctg caccgtgtat   120
tatgaaggcc gcgcgaaaaa agaactgggc gaaggcgatc gcattattat tattaaaccg   180
gatggcagct ttctgattca tcagaaaaag aaacgcgaac cggtggattg cagccgccg    240 ggcagcaaag tgaaaatgga aggcaacagc ctgattagca ttcgccgcaa cccgaaagaa   300
accctgaaag tggatattat tgaagcgtat gcggcggtgc tgtttatggc ggaagattat   360
gaagaactga ccctgaccgg cagcgaagcg gaaatggcgg aactgatttt tcagaacccg   420
aacgtgattg aagaaggctt taaaccgatg tttcgcgaaa aaccgattaa acatggcatt   480
gtggatgtgc tgggcgtgga tcgcgaaggc aacattgtgg tgctggaact gaaacgccgc   540
cgcgcggatc tgcatgcggt gagccagctg aaacgctatg tggatgcgct gaagaagaa    600 catggcaaca agtgcgcgg cattctggtg gcgccgagcc tgaccgaagg cgcgaaaaaa   660
ctgctggaaa aactgggcct ggaatttcgc aaactggaac gccgaaaaa aggcaaaaag   720 aaaagcagca acagaaaac cctggatttt ctgaacgata ccgtgcgcat taccggcgcg   780
agcccgccgg aagcgattca gtaa                                           804

<210> SEQ ID NO 22
<211> LENGTH: 804
<212> TYPE: DNA
<213> ORGANISM: Artificial Sequence
<220> FEATURE:
<223> OTHER INFORMATION: Nucleic acid sequence encoding gene of mismatch
      endonuclease variant S47R+N76D+L123A from PF0012
```

<400> SEQUENCE: 22

```
atggaaatga ccaaagcgat tgtgaaagaa acccgcgca ttgaagaaat taaagaactg      60
ctggaagtgg cggaaagccg cgaaggcctg ctgaccattt ttgcgcgctg caccgtgtat    120
tatgaaggcc gcgcgaaacg cgaactgggc gaaggcgatc gcattattat tattaaaccg    180
gatggcagct ttctgattca tcagaaaaag aaacgcgaac cggtggattg gcagccgccg    240
ggcagcaaag tgaaaatgga aggcaacagc ctgattagca ttcgccgcaa cccgaaagaa    300
accctgaaag tggatattat tgaagcgtat gcggcggtgc tgtttatggc ggaagattat    360
gaagaagcga ccctgaccgg cagcgaagcg gaaatggcgg aactgatttt tcagaacccg    420
aacgtgattg aagaaggctt taaaccgatg tttcgcgaaa accgattaa acatggcatt    480
gtggatgtgc tgggcgtgga tcgcgaaggc aacattgtgg tgctggaact gaaacgccgc    540
cgcgcggatc tgcatgcggt gagccagctg aaacgctatg tggatgcgct gaaagaagaa    600
catggcaaca agtgcgcgg cattctggtg gcgccgagcc tgaccgaagg cgcgaaaaaa    660
ctgctggaaa aactgggcct ggaatttcgc aaactggaac cgccgaaaaa aggcaaaaag    720
aaaagcagca acagaaaaac cctggatttt ctgaacgata ccgtgcgcat taccggcgcg    780
agcccgccgg aagcgattca gtaa                                            804
```

<210> SEQ ID NO 23
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant S47R+N76D+L123G from PF0012

<400> SEQUENCE: 23

```
atggaaatga ccaaagcgat tgtgaaagaa acccgcgca ttgaagaaat taaagaactg      60
ctggaagtgg cggaaagccg cgaaggcctg ctgaccattt ttgcgcgctg caccgtgtat    120
tatgaaggcc gcgcgaaacg cgaactgggc gaaggcgatc gcattattat tattaaaccg    180
gatggcagct ttctgattca tcagaaaaag aaacgcgaac cggtggattg gcagccgccg    240
ggcagcaaag tgaaaatgga aggcaacagc ctgattagca ttcgccgcaa cccgaaagaa    300
accctgaaag tggatattat tgaagcgtat gcggcggtgc tgtttatggc ggaagattat    360
gaagaaggca ccctgaccgg cagcgaagcg gaaatggcgg aactgatttt tcagaacccg    420
aacgtgattg aagaaggctt taaaccgatg tttcgcgaaa accgattaa acatggcatt    480
gtggatgtgc tgggcgtgga tcgcgaaggc aacattgtgg tgctggaact gaaacgccgc    540
cgcgcggatc tgcatgcggt gagccagctg aaacgctatg tggatgcgct gaaagaagaa    600
catggcaaca agtgcgcgg cattctggtg gcgccgagcc tgaccgaagg cgcgaaaaaa    660
ctgctggaaa aactgggcct ggaatttcgc aaactggaac cgccgaaaaa aggcaaaaag    720
aaaagcagca acagaaaaac cctggatttt ctgaacgata ccgtgcgcat taccggcgcg    780
agcccgccgg aagcgattca gtaa                                            804
```

<210> SEQ ID NO 24
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L123S from PF0012

<400> SEQUENCE: 24

```
atggaaatga ccaaagcgat tgtgaaagaa acccgcgca ttgaagaaat taaagaactg      60
ctggaagtgg cggaaagccg cgaaggcctg ctgaccattt ttgcgcgctg caccgtgtat    120
tatgaaggcc gcgcgaaaag cgaactgggc gaaggcgatc gcattattat tattaaaccg    180
gatggcagct ttctgattca tcagaaaaag aaacgcgaac cggtgaactg gcgcccgccg    240
ggcagcaaag tgaaaatgga aggcaacagc ctgattagca ttcgccgcaa cccgaaagaa    300
accctgaaag tggatattat tgaagcgtat gcggcggtgc tgtttatggc ggaagattat    360
gaagaaagca ccctgaccgg cagcgaagcg gaaatggcgg aactgatttt tcagaacccg    420
aacgtgattg aagaaggctt taaaccgatg tttcgcgaaa aaccgattaa acatggcatt    480
gtggatgtgc tgggcgtgga tcgcgaaggc aacattgtgg tgctggaact gaaacgccgc    540
cgcgcggatc tgcatgcggt gagccagctg aaacgctatg tggatgcgct gaaagaagaa    600
catggcaaca agtgcgcgg cattctggtg gcgccgagcc tgaccgaagg cgcgaaaaaa    660
ctgctggaaa actgggcct ggaatttcgc aaactggaac cgccgaaaaa aggcaaaaag    720
aaaagcagca acagaaaac cctggatttt ctgaacgata ccgtgcgcat taccggcgcg    780
agcccgccgg aagcgattca gtaa                                          804
```

<210> SEQ ID NO 25
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L123T from PF0012

<400> SEQUENCE: 25

```
atggaaatga ccaaagcgat tgtgaaagaa acccgcgca ttgaagaaat taaagaactg      60
ctggaagtgg cggaaagccg cgaaggcctg ctgaccattt ttgcgcgctg caccgtgtat    120
tatgaaggcc gcgcgaaaag cgaactgggc gaaggcgatc gcattattat tattaaaccg    180
gatggcagct ttctgattca tcagaaaaag aaacgcgaac cggtgaactg gcgcccgccg    240
ggcagcaaag tgaaaatgga aggcaacagc ctgattagca ttcgccgcaa cccgaaagaa    300
accctgaaag tggatattat tgaagcgtat gcggcggtgc tgtttatggc ggaagattat    360
gaagaaacca ccctgaccgg cagcgaagcg gaaatggcgg aactgatttt tcagaacccg    420
aacgtgattg aagaaggctt taaaccgatg tttcgcgaaa aaccgattaa acatggcatt    480
gtggatgtgc tgggcgtgga tcgcgaaggc aacattgtgg tgctggaact gaaacgccgc    540
cgcgcggatc tgcatgcggt gagccagctg aaacgctatg tggatgcgct gaaagaagaa    600
catggcaaca agtgcgcgg cattctggtg gcgccgagcc tgaccgaagg cgcgaaaaaa    660
ctgctggaaa actgggcct ggaatttcgc aaactggaac cgccgaaaaa aggcaaaaag    720
aaaagcagca acagaaaac cctggatttt ctgaacgata ccgtgcgcat taccggcgcg    780
agcccgccgg aagcgattca gtaa                                          804
```

<210> SEQ ID NO 26
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L123M from PF0012

<400> SEQUENCE: 26

```
atggaaatga ccaaagcgat tgtgaaagaa aacccgcgca ttgaagaaat taaagaactg    60
ctggaagtgg cggaaagccg cgaaggcctg ctgaccattt ttgcgcgctg caccgtgtat   120
tatgaaggcc gcgcgaaaag cgaactgggc gaaggcgatc gcattattat tattaaaccg   180
gatggcagct ttctgattca tcagaaaaag aaacgcgaac cggtgaactg gcgcccgccg   240
ggcagcaaag tgaaaatgga aggcaacagc ctgattagca ttcgccgcaa cccgaaagaa   300
accctgaaag tggatattat tgaagcgtat gcggcggtgc tgtttatggc ggaagattat   360
gaagaaatga ccctgaccgg cagcgaagcg gaaatggcgg aactgatttt tcagaacccg   420
aacgtgattg aagaaggctt taaaccgatg tttcgcgaaa aaccgattaa acatggcatt   480
gtggatgtgc tgggcgtgga tcgcgaaggc aacattgtgg tgctggaact gaaacgccgc   540
cgcgcggatc tgcatgcggt gagccagctg aaacgctatg tggatgcgct gaagaagaa   600 catggcaaca agtgcgcgg cattctggtg gcgccgagcc tgaccgaagg cgcgaaaaaa   660
ctgctggaaa aactgggcct ggaatttcgc aaactggaac gccgaaaaa aggcaaaaag   720 aaaagcagca acagaaaac cctggatttt ctgaacgata ccgtgcgcat taccggcgcg   780
agcccgccgg aagcgattca gtaa                                          804
```

<210> SEQ ID NO 27
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L123C from PF0012

<400> SEQUENCE: 27

```
atggaaatga ccaaagcgat tgtgaaagaa aacccgcgca ttgaagaaat taaagaactg    60
ctggaagtgg cggaaagccg cgaaggcctg ctgaccattt ttgcgcgctg caccgtgtat   120
tatgaaggcc gcgcgaaaag cgaactgggc gaaggcgatc gcattattat tattaaaccg   180
gatggcagct ttctgattca tcagaaaaag aaacgcgaac cggtgaactg gcgcccgccg   240
ggcagcaaag tgaaaatgga aggcaacagc ctgattagca ttcgccgcaa cccgaaagaa   300
accctgaaag tggatattat tgaagcgtat gcggcggtgc tgtttatggc ggaagattat   360
gaagaatgca ccctgaccgg cagcgaagcg gaaatggcgg aactgatttt tcagaacccg   420
aacgtgattg aagaaggctt taaaccgatg tttcgcgaaa aaccgattaa acatggcatt   480
gtggatgtgc tgggcgtgga tcgcgaaggc aacattgtgg tgctggaact gaaacgccgc   540
cgcgcggatc tgcatgcggt gagccagctg aaacgctatg tggatgcgct gaagaagaa   600 catggcaaca agtgcgcgg cattctggtg gcgccgagcc tgaccgaagg cgcgaaaaaa   660
ctgctggaaa aactgggcct ggaatttcgc aaactggaac gccgaaaaa aggcaaaaag   720 aaaagcagca acagaaaac cctggatttt ctgaacgata ccgtgcgcat taccggcgcg   780
agcccgccgg aagcgattca gtaa                                          804
```

<210> SEQ ID NO 28
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L125V from PF0012

<400> SEQUENCE: 28

```
atggaaatga ccaaagcgat tgtgaaagaa acccgcgca ttgaagaaat taaagaactg    60
ctggaagtgg cggaaagccg cgaaggcctg ctgaccattt ttgcgcgctg caccgtgtat   120
tatgaaggcc gcgcgaaaag cgaactgggc gaaggcgatc gcattattat tattaaaccg   180
gatggcagct ttctgattca tcagaaaaag aaacgcgaac cggtgaactg gcgcccgccg   240
ggcagcaaag tgaaaatgga aggcaacagc ctgattagca ttcgccgcaa cccgaaagaa   300
accctgaaag tggatattat tgaagcgtat gcggcggtgc tgtttatggc ggaagattat   360
gaagaactga ccgttaccgg cagcgaagcg gaaatggcgg aactgatttt tcagaacccg   420
aacgtgattg aagaaggctt taaaccgatg tttcgcgaaa aaccgattaa acatggcatt   480
gtggatgtgc tgggcgtgga tcgcgaaggc aacattgtgg tgctggaact gaaacgccgc   540
cgcgcggatc tgcatgcggt gagccagctg aaacgctatg tggatgcgct gaaagaagaa   600
catggcaaca agtgcgcgg cattctggtg gcgccgagcc tgaccgaagg cgcgaaaaaa   660
ctgctggaaa actgggcct ggaatttcgc aaactggaac cgccgaaaaa aggcaaaaag   720
aaaagcagca acagaaaaac cctggatttt ctgaacgata ccgtgcgcat taccggcgcg   780
agcccgccgg aagcgattca gtaa                                         804
```

<210> SEQ ID NO 29
<211> LENGTH: 804
<212> TYPE: DNA
<213> ORGANISM: Artificial Sequence
<220> FEATURE:
<223> OTHER INFORMATION: Nucleic acid sequence encoding gene of mismatch endonuclease variant Q78R+L125A from PF0012

<400> SEQUENCE: 29

```
atggaaatga ccaaagcgat tgtgaaagaa acccgcgca ttgaagaaat taaagaactg    60
ctggaagtgg cggaaagccg cgaaggcctg ctgaccattt ttgcgcgctg caccgtgtat   120
tatgaaggcc gcgcgaaaag cgaactgggc gaaggcgatc gcattattat tattaaaccg   180
gatggcagct ttctgattca tcagaaaaag aaacgcgaac cggtgaactg gcgcccgccg   240
ggcagcaaag tgaaaatgga aggcaacagc ctgattagca ttcgccgcaa cccgaaagaa   300
accctgaaag tggatattat tgaagcgtat gcggcggtgc tgtttatggc ggaagattat   360
gaagaactga ccgcgaccgg cagcgaagcg gaaatggcgg aactgatttt tcagaacccg   420
aacgtgattg aagaaggctt taaaccgatg tttcgcgaaa aaccgattaa acatggcatt   480
gtggatgtgc tgggcgtgga tcgcgaaggc aacattgtgg tgctggaact gaaacgccgc   540
cgcgcggatc tgcatgcggt gagccagctg aaacgctatg tggatgcgct gaaagaagaa   600
catggcaaca agtgcgcgg cattctggtg gcgccgagcc tgaccgaagg cgcgaaaaaa   660
ctgctggaaa actgggcct ggaatttcgc aaactggaac cgccgaaaaa aggcaaaaag   720
aaaagcagca acagaaaaac cctggatttt ctgaacgata ccgtgcgcat taccggcgcg   780
agcccgccgg aagcgattca gtaa                                         804
```

<210> SEQ ID NO 30
<211> LENGTH: 1629
<212> TYPE: DNA
<213> ORGANISM: Artificial Sequence
<220> FEATURE:
<223> OTHER INFORMATION: Nucleic acid sequence encoding gene of mismatch endonuclease variant hetero dimer from variant S47R+N76D+L123A and variant Q78R+L123M

<400> SEQUENCE: 30

-continued

```
atggaaatga ccaaagcgat tgtgaaagaa acccgcgca ttgaagaaat taaagaactg    60
ctggaagtgg cggaaagccg cgaaggcctg ctgaccattt ttgcgcgctg caccgtgtat  120
tatgaaggcc gcgcgaaacg cgaactgggc gaaggcgatc gcattattat tattaaaccg  180
gatggcagct ttctgattca tcagaaaaag aaacgcgaac cggtggattg gcagccgccg  240
ggcagcaaag tgaaaatgga aggcaacagc ctgattagca ttcgccgcaa cccgaaagaa  300
accctgaaag tggatattat tgaagcgtat gcggcggtgc tgtttatggc ggaagattat  360
gaagaagcga ccctgaccgg cagcgaagcg gaaatggcgg aactgatttt tcagaacccg  420
aacgtgattg aagaaggctt taaaccgatg tttcgcgaaa aaccgattaa acatggcatt  480
gtggatgtgc tgggcgtgga tcgcgaaggc aacattgtgg tgctggaact gaaacgccgc  540
cgcgcggatc tgcatgcggt gagccagctg aaacgctatg tggatgcgct gaaagaagaa  600
catggcaaca aagtgcgcgg cattctggtg gcgccgagcc tgaccgaagg cgcgaaaaaa  660
ctgctggaaa aactgggcct ggaatttcgc aaactggaac cgccgaaaaa aggcaaaaag  720
aaaagcagca acagaaaaac cctggatttt ctgaacgata ccgtgcgcat taccggcgcg  780
agcccgccgg aagcgattca gctggaagtt ctgttccagg ggcccatgga atgaccaaa   840
gcgattgtga agaaaaccc gcgcattgaa gaaattaaag aactgctgga agtggcggaa   900
agccgcgaag cctgctgac cattttttgcg cgctgcaccg tgtattatga aggccgcgcg  960
aaaagcgaac tgggcgaagg cgatcgcatt attattatta aaccggatgg cagctttctg 1020
attcatcaga aaagaaacg cgaaccggtg aactggcgcc cgccgggcag caaagtgaaa 1080
atggaaggca acagcctgat tagcattcgc cgcaacccga agaaaccct gaaagtggat  1140
attattgaag cgtatgcggc ggtgctgttt atggcggaag attatgaaga aatgaccctg 1200
accggcagcg aagcggaaat ggcggaactg attttttcaga cccgaacgt gattgaagaa 1260
ggctttaaac cgatgtttcg cgaaaaaccg attaaacatg gcattgtgga tgtgctgggc 1320
gtggatcgcg aaggcaacat tgtggtgctg gaactgaaac gccgcgcgc ggatctgcat 1380
gcggtgagcc agctgaaacg ctatgtggat gcgctgaaag aagaacatgg caacaaagtg 1440
cgcggcattc tggtggcgcc gagcctgacc gaaggcgcga aaaaactgct ggaaaaactg 1500
ggcctggaat ttcgcaaact ggaaccgccg aaaaaggca aaagaaaag cagcaaacag 1560
aaaaccctgg attttctgaa cgataccgtg cgcattaccg gcgcgagccc gccggaagcg 1620
attcagtaa                                                         1629
```

```
<210> SEQ ID NO 31
<211> LENGTH: 23
<212> TYPE: DNA
<213> ORGANISM: Artificial Sequence
<220> FEATURE:
<223> OTHER INFORMATION: Synthetic oligo nucleotide "NucS-Template-T"

<400> SEQUENCE: 31
aatatccgtt aggcattgaa gca                                           23

<210> SEQ ID NO 32
<211> LENGTH: 23
<212> TYPE: DNA
<213> ORGANISM: Artificial Sequence
<220> FEATURE:
<223> OTHER INFORMATION: Synthetic oligo nucleotide "NucS-Template-G"

<400> SEQUENCE: 32
aatatccggt aggcattgaa gca                                           23
```

```
<210> SEQ ID NO 33
<211> LENGTH: 15
<212> TYPE: DNA
<213> ORGANISM: Artificial Sequence
<220> FEATURE:
<223> OTHER INFORMATION: Synthetic oligo nucleotide "NucS-Probe-T".
      5'-end is labeled with FAM and 3'-end is labeled with Eclipse.

<400> SEQUENCE: 33
atgcctatcg gatat                                                          15

<210> SEQ ID NO 34
<211> LENGTH: 15
<212> TYPE: DNA
<213> ORGANISM: Artificial Sequence
<220> FEATURE:
<223> OTHER INFORMATION: Synthetic oligo nucleotide "NucS-Probe-G".
      5'-end is labeled with FAM and 3'-end is labeled with Eclipse.

<400> SEQUENCE: 34
atgcctagcg gatat                                                          15

<210> SEQ ID NO 35
<211> LENGTH: 8
<212> TYPE: PRT
<213> ORGANISM: Artificial Sequence
<220> FEATURE:
<223> OTHER INFORMATION: Amino acid sequence of Linker

<400> SEQUENCE: 35

Leu Glu Val Leu Phe Gln Gly Pro
1               5

<210> SEQ ID NO 36
<211> LENGTH: 24
<212> TYPE: DNA
<213> ORGANISM: Artificial Sequence
<220> FEATURE:
<223> OTHER INFORMATION: Nucleic acid sequence encoding Linker

<400> SEQUENCE: 36
ctggaagttc tgttccaggg gccc                                                24
```

The invention claimed is:

1. A polypeptide represented by the following (A) or (B):
(A) a polypeptide selected from the group consisting of the following (1) to (3), and having an activity of cleaving a nucleic acid chain having guanine (G) forming a mismatched base pair in a double-stranded nucleic acid:
(1) a polypeptide comprising an amino acid sequence comprising a substitution of a basic amino acid residue for serine at position 47 and a substitution of an acidic amino acid residue for asparagine at position 76 in an amino acid sequence set forth in SEQ ID NO: 1;
(2) a polypeptide comprising an amino acid sequence comprising mutations of further one to ten amino acid residues in the substituted amino acid sequence described in (1), wherein the mutations are substitution, deletion, insertion and/or addition and the amino acid substitutions in the substituted amino acid sequence described in (1) are retained; and
(3) a polypeptide comprising an amino acid sequence having 80% or more identity to the substituted or mutated amino acid sequence described in (1) or (2), wherein the amino acid substitutions or mutations in the substituted or mutated amino acid sequence described in (1) or (2) are retained; or
(B) a polypeptide selected from the group consisting of the following (5) to (7), and having an activity of cleaving a nucleic acid chain having thymine (T) forming a mismatched base pair in a double-stranded nucleic acid:
(5) a polypeptide comprising an amino acid sequence comprising a substitution of a basic amino acid residue for glutamine at position 78 and a substitution of a neutral (polar, uncharged) amino acid residue or a sulfur-containing amino acid residue for leucine at position 123 or of a hydrophobic amino acid residue or a sulfur-containing amino acid residue for leucine at position 125 in an amino acid sequence set forth in SEQ ID NO: 1;
(6) a polypeptide comprising an amino acid sequence comprising mutations of further one to ten amino acid residues in the substituted amino acid sequence described in (5), wherein the mutations are substitution, deletion, insertion and/or addition and the amino acid substitutions in the substituted amino acid sequence described in (5) are retained; and (7) a polypeptide comprising an amino acid sequence having 80% or more identity to the substituted or mutated amino acid sequence described in (5) or (6), wherein the amino acid substitutions or mutations in the substituted or mutated amino acid sequence described in (5) or (6) are retained.

2. The polypeptide according to claim 1, wherein the basic amino acid residue is lysine, arginine, or histidine, the acidic amino acid residue is aspartic acid or glutamic acid, the neutral (polar, uncharged) amino acid is threonine, serine, asparagine, glutamine, tyrosine, or cysteine, the sulfur-containing amino acid is cysteine or methionine, and the hydrophobic (non-polar) amino acid is alanine, glycine, valine, leucine, isoleucine, proline, tryptophan, phenylalanine, or methionine.

3. The polypeptide according to claim 1, which comprises an amino acid sequence selected from SEQ ID NOs: 6 to 15.

4. A nucleic acid encoding the polypeptide according to claim 1.

5. The nucleic acid according to claim 4, which comprises a nucleotide sequence selected from SEQ ID NOs: 21 to 30.

6. An expression vector comprising the nucleic acid according to claim 4 and an expression regulatory sequence.

7. A cell transformed with the expression vector according to claim 6, expressing a polypeptide having a mismatch endonuclease activity.

8. A method for cleaving a double-stranded nucleic acid having a mismatch, the method comprising a step of treating the double-stranded nucleic acid with the polypeptide according to claim 1.

9. A composition comprising the following (a) to (d):
(a) the polypeptide according to claim 1;
(b) an oligonucleotide that forms a double-stranded nucleic acid containing at least one mismatch when hybridized with a non-target nucleic acid, wherein the double-stranded nucleic acid is cleaved by the polypeptide of (a), and forms a double-stranded nucleic acid that is not cleaved by the polypeptide of (a) when hybridized with a target nucleic acid;
(c) at least one pair of oligonucleotide primers; and
(d) a polypeptide having a DNA polymerase activity.

10. A method for amplifying a nucleic acid, the method comprising the following steps (1) and (2):
(1) a step of preparing a composition comprising a nucleic acid molecule as a template and the following (a) to (d);
(a) the polypeptide according to claim 1;
(b) an oligonucleotide that forms a double-stranded nucleic acid containing at least one mismatch when hybridized with a non-target nucleic acid, wherein the double-stranded nucleic acid is cleaved by the polypeptide of (a), and forms a double-stranded nucleic acid that is not cleaved by the polypeptide of (a) when hybridized with a target nucleic acid;
(c) at least one pair of oligonucleotide primers; and
(d) a polypeptide having a DNA polymerase activity; and
(2) a step of reacting the composition obtained in step (1) under appropriate conditions to perform nucleic acid amplification.

11. The method according to claim 10, wherein the nucleic acid amplification is performed by a polymerase chain reaction (PCR) method, an isothermal nucleic acid amplification method, or a multiple displacement amplification (MDA) method.

12. A method for suppressing amplification of a nucleic acid comprising a specific nucleotide sequence, the method comprising a step of performing a nucleic acid amplification reaction in the presence of the following (a) to (d):
(a) an oligodeoxynucleotide designed to produce one or several mismatches when hybridized with the nucleic acid comprising a specific nucleotide sequence or a complementary strand thereof;
(b) a DNA polymerase;
(c) at least one pair of oligonucleotide primers; and
(d) the polypeptide according to claim 1.

13. The method according to claim 12, wherein the nucleic acid amplification reaction is polymerase chain reaction (PCR) or isothermal nucleic acid amplification.

14. The method of claim 12, wherein a target DNA in the nucleic acid amplification reaction is amplified and the specific nucleotide sequence is not amplified, and wherein the specific nucleotide sequence differs from the target DNA by one or several nucleotides.

15. The method according to claim 14, wherein the target DNA differs from the specific nucleotide sequence by a single nucleotide.

16. The method according to claim 15, wherein the single nucleotide is a single nucleotide polymorphism that correlates with canceration or a therapeutic effect of a therapeutic agent for cancer.

17. A polypeptide in a dimer-form comprising a homodimer having polypeptide (A) according to claim 1 as a subunit.

18. A polypeptide in a dimer-form comprising a homodimer having polypeptide (B) according to claim 1 as a subunit.

19. A polypeptide in a dimer-form comprising a heterodimer having polypeptides (A) and (B) according to claim 1 as subunits.

* * * * *